United States Patent
Hanif et al.

(10) Patent No.: US 12,396,044 B2
(45) Date of Patent: Aug. 19, 2025

(54) RADIO LINK MANAGEMENT FOR SIDELINK CARRIER AGGREGATION COMPONENT CARRIERS

(71) Applicant: QUALCOMM Incorporated, San Diego, CA (US)

(72) Inventors: Ahmed Farhan Hanif, Versailles (FR); Jelena Damnjanovic, Del Mar, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 585 days.

(21) Appl. No.: 17/805,416

(22) Filed: Jun. 3, 2022

(65) Prior Publication Data
US 2023/0397268 A1    Dec. 7, 2023

(51) Int. Cl.
*H04W 76/14* (2018.01)
*H04L 5/00* (2006.01)
*H04W 24/04* (2009.01)

(52) U.S. Cl.
CPC ............. *H04W 76/14* (2018.02); *H04L 5/001* (2013.01); *H04W 24/04* (2013.01)

(58) Field of Classification Search
CPC ..... H04W 76/14; H04W 24/04; H04W 72/02; H04W 72/0453; H04W 72/40; H04W 76/20; H04W 92/18; H04L 5/001
See application file for complete search history.

(56) References Cited

U.S. PATENT DOCUMENTS

| | | | | |
|---|---|---|---|---|
| 2013/0136015 A1* | 5/2013 | Ojala | ................... | H04W 72/542 370/252 |
| 2015/0172987 A1* | 6/2015 | Balakrishnan | ........ | H04L 5/0098 370/331 |

(Continued)

FOREIGN PATENT DOCUMENTS

| | | | | |
|---|---|---|---|---|
| EP | 4297504 A1 * | 12/2023 | ............ | H04W 76/14 |
| WO | 2022074126 A1 | 4/2022 | | |

OTHER PUBLICATIONS

3GPP: "3rd Generation Partnership Project, Technical Specification Group Radio Access Network, Overall Description of Radio Access Network (RAN) Aspects for Vehicle-to-everything (V2X) based on LTE and NR (Release 17)", 3GPP Standard, Technical Report, 3GPP TR 37.985, 3GPP, Mobile Competence Centre, 650, Route Des Lucioles, F-06921 Sophia-Antipolis Cedex, France, No. V17.1.1, Mar. 2022, Apr. 8, 2022, pp. 1-38, XP052146614, Sections 5.1, 6.2, 6.5.

(Continued)

*Primary Examiner* — Ian N Moore
*Assistant Examiner* — Latresa A McCallum
(74) *Attorney, Agent, or Firm* — Procopio, Cory, Hargreaves & Savitch LLP

(57) ABSTRACT

A first UE may establish a sidelink connection with at least one second UE via a first PCC. The first PCC and a first set of SCCs may be associated with a first transmission of the first UE. The sidelink connection with the at least one second UE may be associated with carrier aggregation. The first UE may detect, and transmit a first indication, that at least one of (i) the sidelink connection is associated with an RLF value that is within an RLF threshold of an RLF limit, or (ii) the first set of SCCs is capable of maintaining the sidelink connection. The first UE may receive, based on the first indication, a second indication of a switch of the sidelink (Continued)

connection from the first PCC to a first SCC of the first set of SCCs.

30 Claims, 11 Drawing Sheets

(56) References Cited

U.S. PATENT DOCUMENTS

| | | | |
|---|---|---|---|
| 2016/0095086 A1* | 3/2016 | Zhang ................... | H04L 5/0085 370/329 |
| 2016/0227542 A1 | 8/2016 | Chen et al. | |
| 2016/0242167 A1* | 8/2016 | Takano ................. | H04W 76/19 |
| 2018/0132210 A1* | 5/2018 | Rico Alvarino ...... | H04L 5/0053 |
| 2020/0163142 A1* | 5/2020 | Ryoo .................... | H04W 76/15 |
| 2020/0252989 A1 | 8/2020 | Chen et al. | |
| 2020/0351067 A1* | 11/2020 | Hui ........................ | H04L 5/001 |
| 2020/0389848 A1* | 12/2020 | Ji ........................... | H04L 1/203 |
| 2021/0051587 A1 | 2/2021 | Wu et al. | |
| 2021/0251039 A1* | 8/2021 | Liang ................... | H04W 76/27 |

OTHER PUBLICATIONS

International Search Report and Written Opinion—PCT/US2023/022592—ISA/EPO—Aug. 30, 2023.

\* cited by examiner

RADIO LINK MANAGEMENT FOR SIDELINK CARRIER AGGREGATION COMPONENT CARRIERS

TECHNICAL FIELD

The present disclosure relates generally to communication systems, and more particularly, to a sidelink radio link management (RLM) system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may have a memory and at least once processor coupled to the memory at a first user equipment (UE). Based at least in part on information stored in the memory, the at least one processor may be configured to establish a sidelink connection with at least one second UE via a first primary component carrier (PCC). The first PCC and a first set of secondary component carriers (SCCs) may be associated with a first transmission of the first UE. The sidelink connection with the at least one second UE may be associated with carrier aggregation (CA). Based at least in part on information stored in the memory, the at least one processor may be configured to detect that at least one of (i) the sidelink connection is associated with a radio link failure (RLF) value that is within an RLF threshold of an RLF limit, or (ii) at least one of the first set of SCCs is capable of maintaining the sidelink connection. Based at least in part on information stored in the memory, the at least one processor may be configured to transmit a first indication of at least one of (i) the sidelink connection being associated with the RLF value that is within the RLF threshold of the RLF limit, or (ii) the at least one of the first set of SCCs being capable of maintaining the sidelink connection. Based at least in part on information stored in the memory, the at least one processor may be configured to receive, based on the first indication, a second indication of a switch of the sidelink connection from the first PCC to a first SCC of the first set of SCCs.

In another aspect of the disclosure, a method, a computer-readable medium, and an apparatus are provided. The apparatus may have a memory and at least once processor coupled to the memory at a first UE. Based at least in part on information stored in the memory, the at least one processor may be configured to establish a sidelink connection with at least one second UE via at least one second PCC. The at least one second PCC and at least one second set of SCCs may be associated with a second transmission of the at least one second UE. The sidelink connection with the at least one second UE may be associated with carrier aggregation. Based at least in part on information stored in the memory, the at least one processor may be configured to detect that at least one of (i) the sidelink connection is associated with an RLF value that is within an RLF threshold of an RLF limit, or (ii) at least one of the at least one second set of SCCs is capable of maintaining the sidelink connection. Based at least in part on information stored in the memory, the at least one processor may be configured to transmit a first indication of at least one of (i) the sidelink connection being associated with the RLF value that is within the RLF threshold of the RLF limit, or (ii) the at least one of the at least one second set of SCCs being capable of maintaining the sidelink connection. Based at least in part on information stored in the memory, the at least one processor may be configured to receive, based on the first indication, a second indication of a switch of the sidelink connection from the second PCC to at least a second SCC of the at least one second set of SCCs.

In another aspect of the disclosure, a method, a computer-readable medium, and an apparatus are provided. The apparatus may have a memory and at least once processor coupled to the memory at a second UE. Based at least in part on information stored in the memory, the at least one processor may be configured to establish a sidelink connection with at least one first UE via at least one first PCC. The at least one first PCC and at least one first set of SCCs may be associated with a first transmission of the first UE. The sidelink connection with the at least one first UE may be associated with carrier aggregation. Based at least in part on information stored in the memory, the at least one processor may be configured to receive a first indication of at least one of (i) the sidelink connection being associated with an RLF value that is within an RLF threshold of an RLF limit, or (ii) the at least one first set of SCCs being capable of maintaining the sidelink connection. Based at least in part on information stored in the memory, the at least one processor may be configured to switch, based on the first indication, the sidelink connection from the at least one first PCC to the at least a first SCC of the first set of SCCs. Based at least in part on information stored in the memory, the at least one processor may be configured to transmit a second indication of the switch of the sidelink connection from the at least one first PCC to the at least the first SCC of the first set of SCCs.

In another aspect of the disclosure, a method, a computer-readable medium, and an apparatus are provided. The apparatus may have a memory and at least once processor coupled to the memory at a second UE. Based at least in part on information store in the memory, the at least one processor may be configured to establish a sidelink connection with at least one first UE via a second PCC. The second PCC and a second set of SCCs may be associated with a second transmission of the second UE. The sidelink connection with the at least one first UE may be associated with carrier aggregation. Based at least in part on information stored in the memory, the at least one processor may be configured to receive a first indication of at least one of (i) the sidelink connection being associated with an RLF value that is within an RLF threshold of an RLF limit, or (ii) at least one of the second set of SCCs being capable of maintaining the sidelink connection. Based at least in part on information store in the memory, the at least one processor may be configured to switch, based on the first indication, the sidelink connection from the second PCC to a second SCC of the second set of SCCs. Based at least in part on information store in the memory, the at least one processor may be configured to transmit a second indication of the switch of the sidelink connection from the second PCC to the second SCC of the second set of SCCs.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
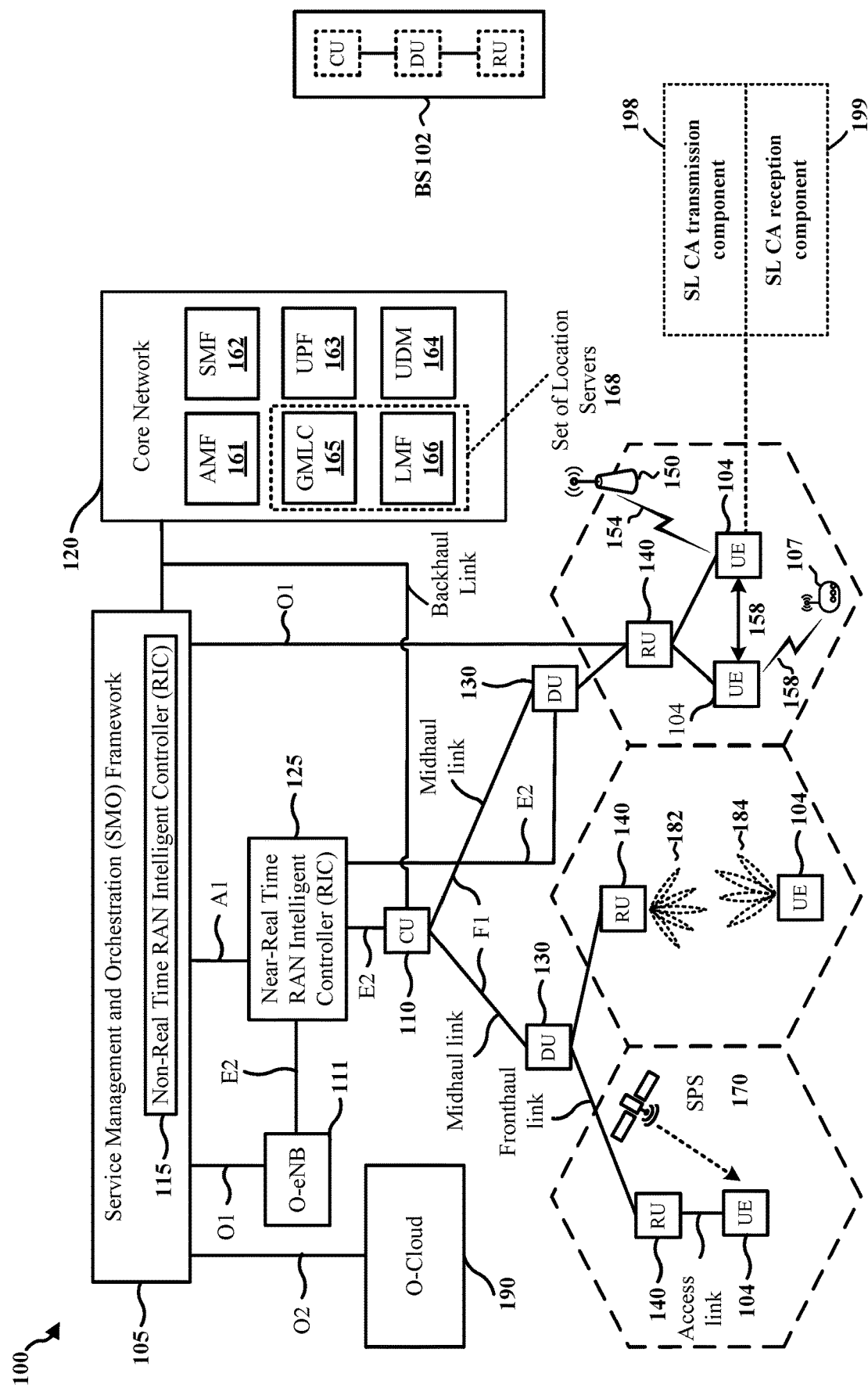
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media may include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158 or with other devices configured to communicate using a D2D communication link 158, such as Road Side Unit (RSU) 107. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSCCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a sidelink (SL) carrier aggregation (CA) transmission component 198 that may be configured to establish a sidelink connection with at least one second UE via a first PCC or at least one second PCC. The first PCC and a first set of SCCs may be associated with a first transmission of the SL CA transmission component 198. The at least one second PCC and at least one second set of SCCs may be associated with a second transmission of the at least one second UE. The sidelink connection with the at least one second UE may be associated with carrier aggregation. The SL CA transmission component 198 may be further configured to detect that at least one of (i) the sidelink connection is associated with an RLF value that is within an RLF threshold of an RLF limit, or (ii) at least one of the first set of SCCs or at least one of the at least one second set of SCCs is capable of maintaining the sidelink connection. The SL CA transmission component 198 may be further configured to transmit a first indication of at least one of (i) the sidelink connection being associated with the RLF value that is within the RLF threshold of the RLF limit, or (ii) the at least one of the first set of SCCs or the at least one of the at least one second set of SCCs being capable of maintaining the sidelink connection. The SL CA transmission component 198 may be further configured to receive, based on the first indication, a second indication of a switch of the sidelink connection from the first PCC to a first SCC of the first set of SCCs or from the at least one second PCC to at least a second SCC of the at least one second set of SCCs.

In certain aspects, the UE 104 may be configured to include a SL CA reception component 199 that may be configured to establish a sidelink connection with at least one first UE via a first PCC or a second PCC. The at least one first PCC and at least one first set of SCCs may be associated with a first transmission of the at least one first UE. The second PCC and a second set of SCCs may be associated with a second transmission of the SL CA reception component 199. The sidelink connection with the at least one first UE may be associated with carrier aggregation. The SL CA reception component 199 may be further configured to receive a first indication of at least one of (i) the sidelink connection being associated with an RLF value that is within an RLF threshold of an RLF limit, or (ii) at least one of the at least one first set of SCCs or at least one of the second set of SCCs being capable of maintaining the sidelink connection. The SL CA reception component 199 may be further configured to switch, based on the first indication, the sidelink connection from the at least one first PCC to at least a first SCC of the first set of SCCs or from the second PCC to a second SCC of the second set of SCCs. The SL CA reception component 199 may be further configured to transmit a second indication of the switch of the sidelink connection from the at least one first PCC to the at least the first SCC of the first set of SCCs or from the second PCC to the second SCC of the second set of SCCs. Although the following description may be focused on radio link management systems for sidelink carrier aggregation component carriers, the concepts described herein may be applicable to radio link management systems for other D2D communication links, such as for example, Bluetooth, Wi-Fi based on the Institute of Electrical and Electronics Engineers (IEEE) 802.11 standard, LTE, or NR.

Each UE 104 may be configured to have an SL CA transmission component 198, an SL CA reception component 199, or both an SL CA transmission component 198 and an SL CA reception component 199.

Figure 2:
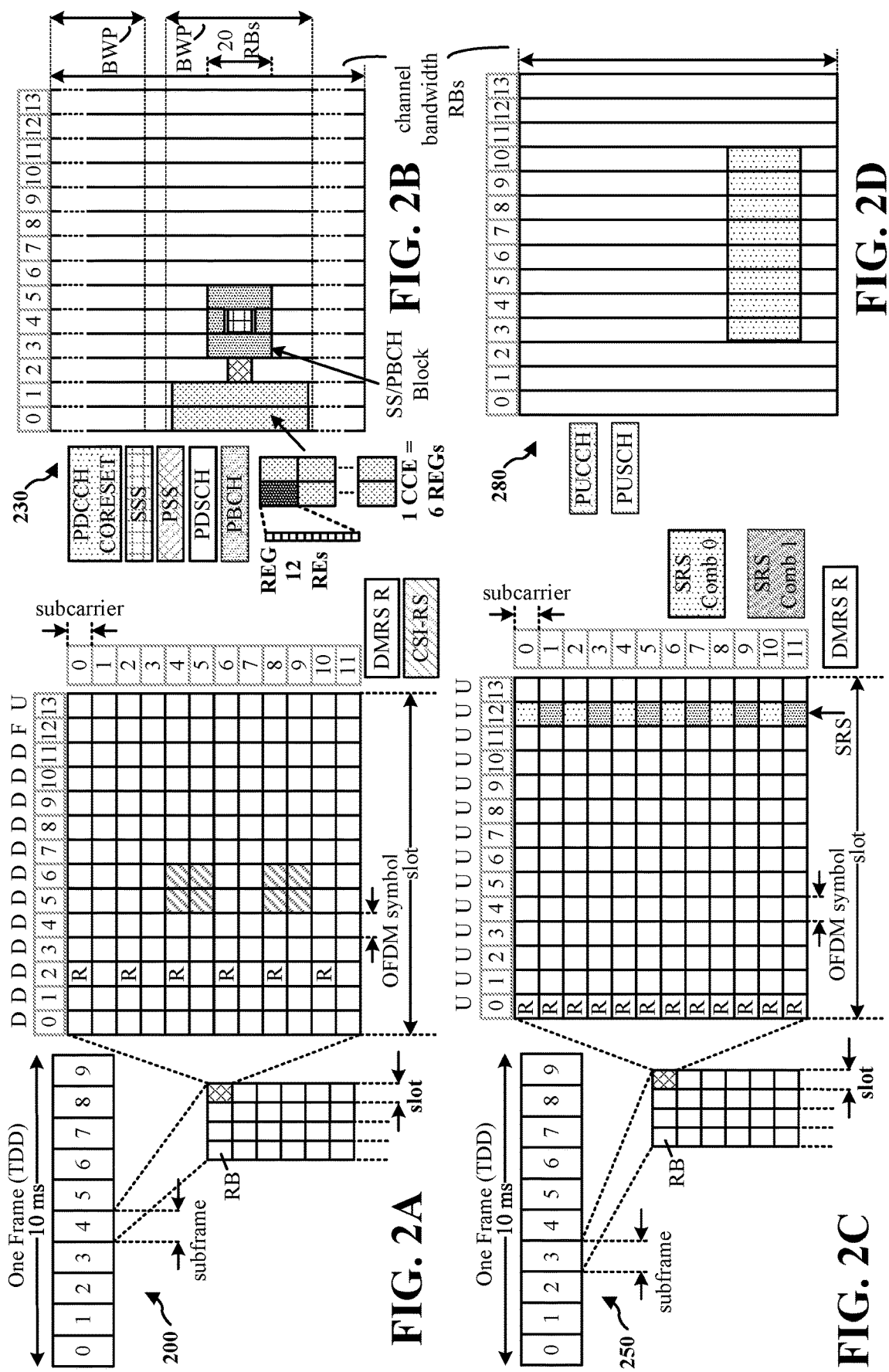
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA)

symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$[KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame.

The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
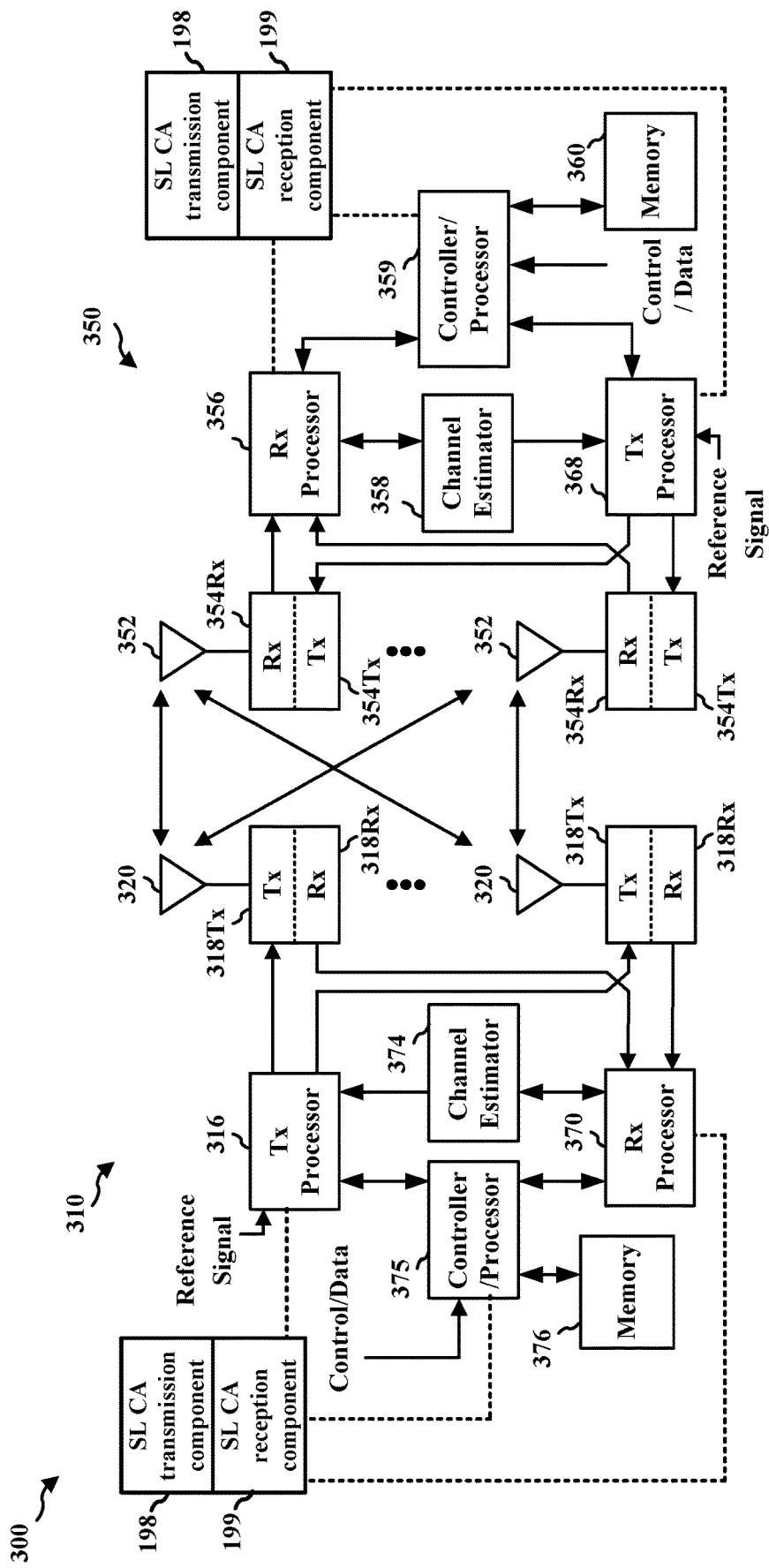
FIG. 3 is a diagram illustrating an example of a base station and user equipment (UE) in an access network.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and 350 may include a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318Tx. Each transmitter 318Tx may modulate an RF carrier with a respective spatial stream for transmission.

At the device 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the device 350. If multiple spatial streams are destined for the device 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The transmission is processed at the device 310 in a manner similar to that described in connection with the receiver function at the device 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the SL CA transmission component 198 of FIG. 1.

At least one of the Tx processor 368, the Rx processor 356, and the controller/processor 359 may be configured to perform aspects in connection with the SL CA reception component 199 of FIG. 1.

At least one of the Tx processor 316, the Rx processor 370, and the controller/processor 375 may be configured to perform aspects in connection with the SL CA transmission component 198 of FIG. 1.

At least one of the Tx processor 316, the Rx processor 370, and the controller/processor 375 may be configured to perform aspects in connection with the SL CA reception component 199 of FIG. 1.

Figure 4:
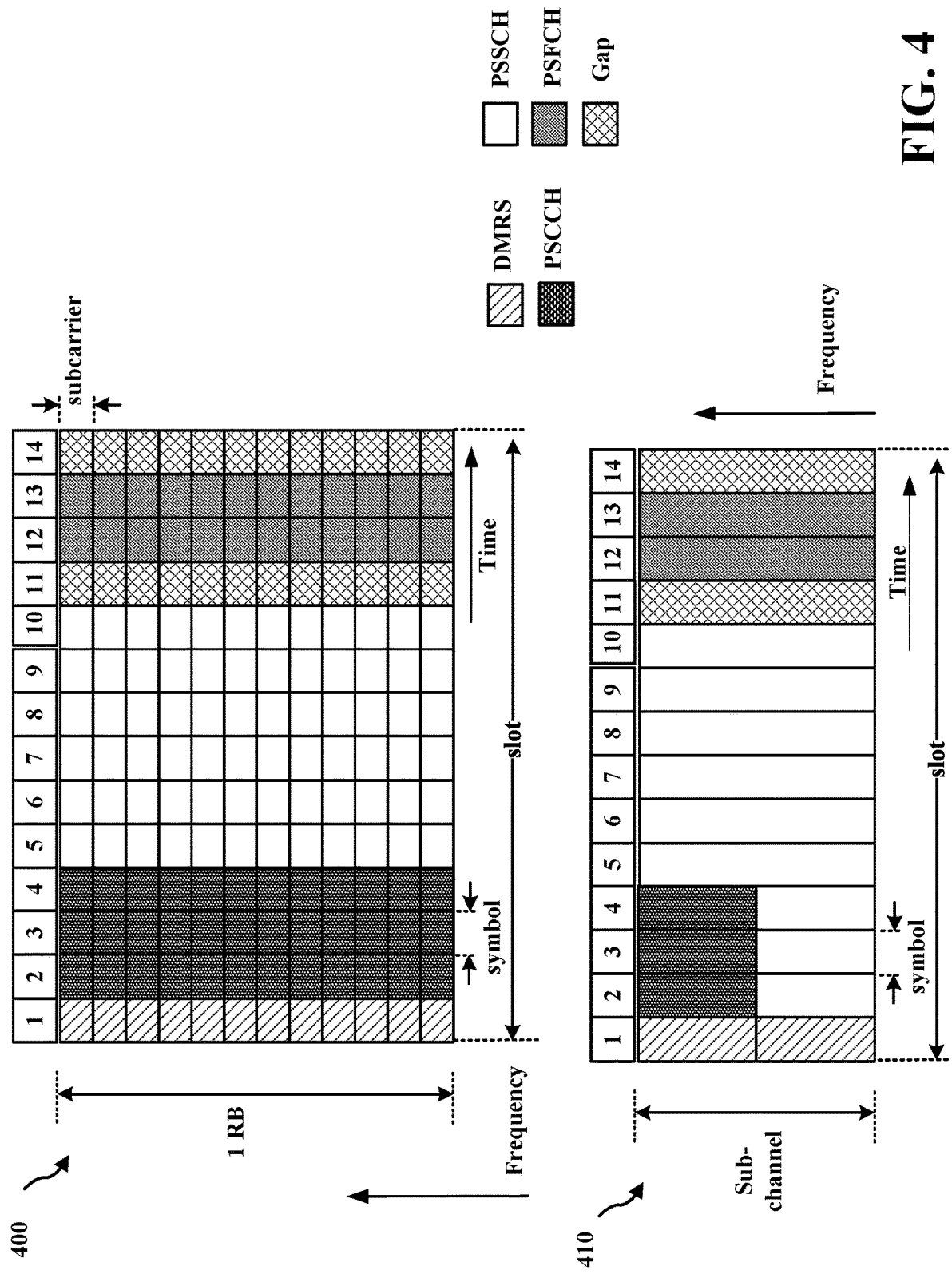
FIG. 4 are diagrams illustrating example aspects of slot structures that may be used for sidelink communication.

FIG. 4 includes diagram 400 and diagram 410 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25

PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The physical sidelink shared channel (PSCCH) occupies at least one subchannel. The PSCCH may include a first portion of sidelink control information (SCI), and the PSCCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information in PSCCH and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 4. Multiple slots may be aggregated together in some aspects.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 4. Although the following description, including the example slot structure of FIG. 4, may provide examples for sidelink communication in connection with 5G NR, the concepts described herein may be applicable to other similar areas, such as LTE, LTE-A, CDMA, GSM, and other wireless technologies.

Figure 5:
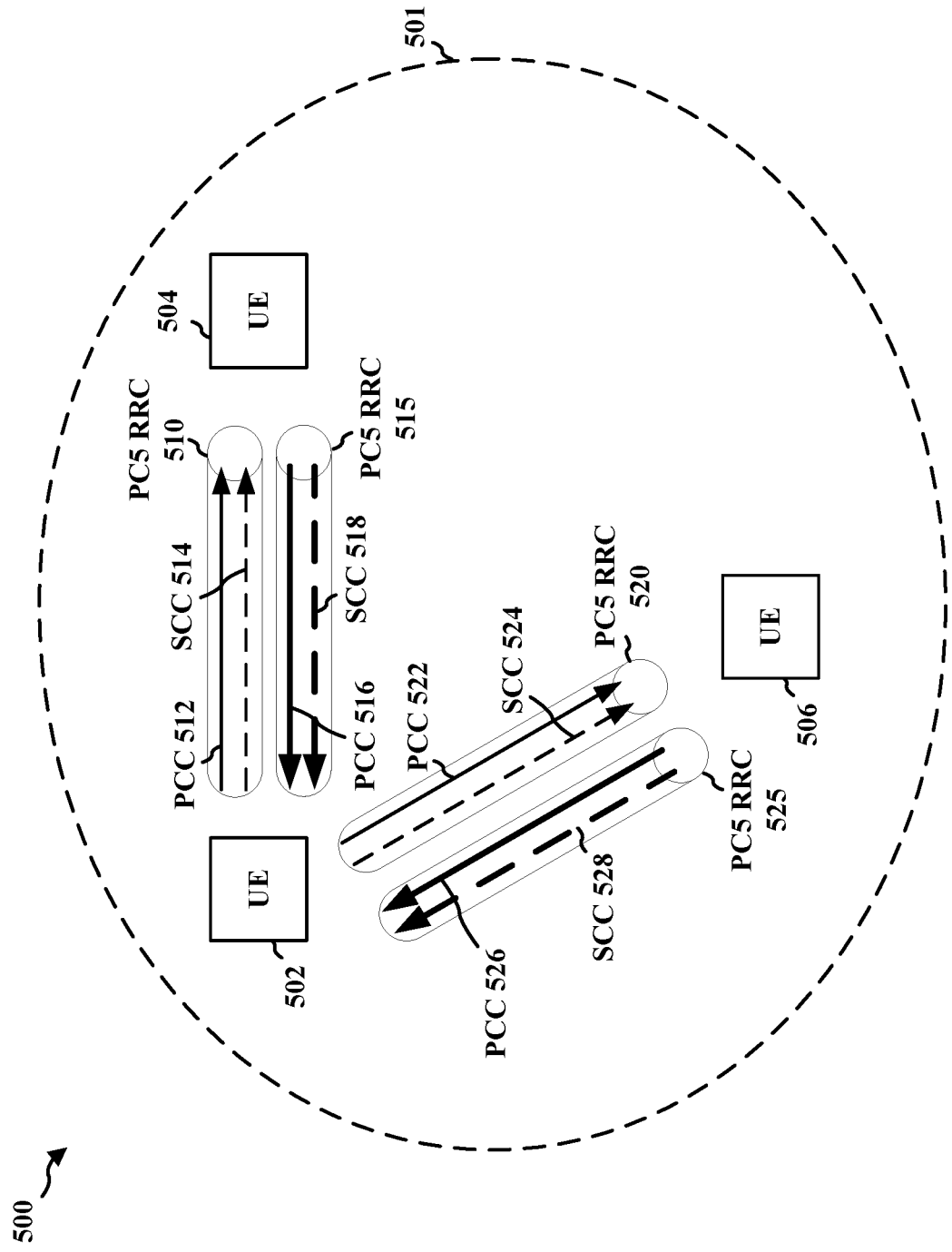
FIG. 5 is a diagram illustrating an example of UEs configured to have directional sidelink PCC for transmissions between the UE.

FIG. 5 illustrates an example 500 of sidelink communication between a UE 502, a UE 504, and a UE 506. Each of the UEs 502, 504, and 506 may be a device configured to communicate with other device using a D2D connection, such as UE 104 or RSU 107 in FIG. 1 configured to communicate with one another using D2D communication link 158. The communication may be based on a slot structure including aspects described in connection with FIG. 4. For example, the UE 502 may transmit a sidelink transmission that includes, for example, a control channel (e.g., PSCCH) and/or a corresponding data channel (e.g., PSCCH), that may be received by UE 504 or UE 506. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 502, 504, and 506 may each be capable of sidelink transmission in addition to sidelink reception.

The UEs 502 and 504 may be configured to communicate using a PC5 RRC link 510 having a PCC 512 and a set of SCCs 514 from the UE 502 to the UE 504. The set of SCCs 514 may be a set of one or more SCCs. The UEs 502 and 504 may also be configured to communicate using a PC5 RRC link 515 having a PCC 516 and a set of SCCs 518 from the UE 504 to the UE 502. The set of SCCs 518 may be a set of one or more SCCs. Each of the PC5 RRC links 510, 515 may be a sidelink connection having a PCC and one or more SCCs in a given direction. As shown, the UEs 502 and 504 may be configured to have two separate one-way D2D links that allow the UE 502 to transmit sidelink transmissions to the UE 504 via the PC5 RRC link 510 and that allow the UE 504 to transmit sidelink transmissions to the UE 502 via the PC5 RRC link 515. The resources used for PCC 512 may not overlap with the resources used for PCC 516, allowing for simultaneous bidirectional transmissions to occur without interference with one another between the UE 502 and the UE 504.

Similarly, the UEs 502 and 506 may be configured to communicate using a PC5 RRC link 520 having a PCC 522 and a set of SCCs 524 from the UE 502 to the UE 504. The set of SCCs 524 may be a set of one or more SCCs. The UEs 502 and 506 may be configured to communicate using a PC5 RRC link 525 having a PCC 526 and a set of SCCs 528 from the UE 506 to the UE 502. The set of SCCs 528 may be a set of one or more SCCs. Each of the PC5 RRC links 520, 525 may be a sidelink connection having a PCC and one or more SCCs in a given direction. The transmissions may be unicast, broadcast or multicast to nearby devices. For example, UE 502 may transmit a broadcast via PCC 512 and PCC 522 intended for receipt by the UE 504 and the UE 506 within a range 501 of UE 502. The resources used for PCC 522 may not overlap with the resources used for PCC 526, allowing for simultaneous bidirectional transmissions to occur without interference with one another between the UE 502 and the UE 506.

Figure 6:
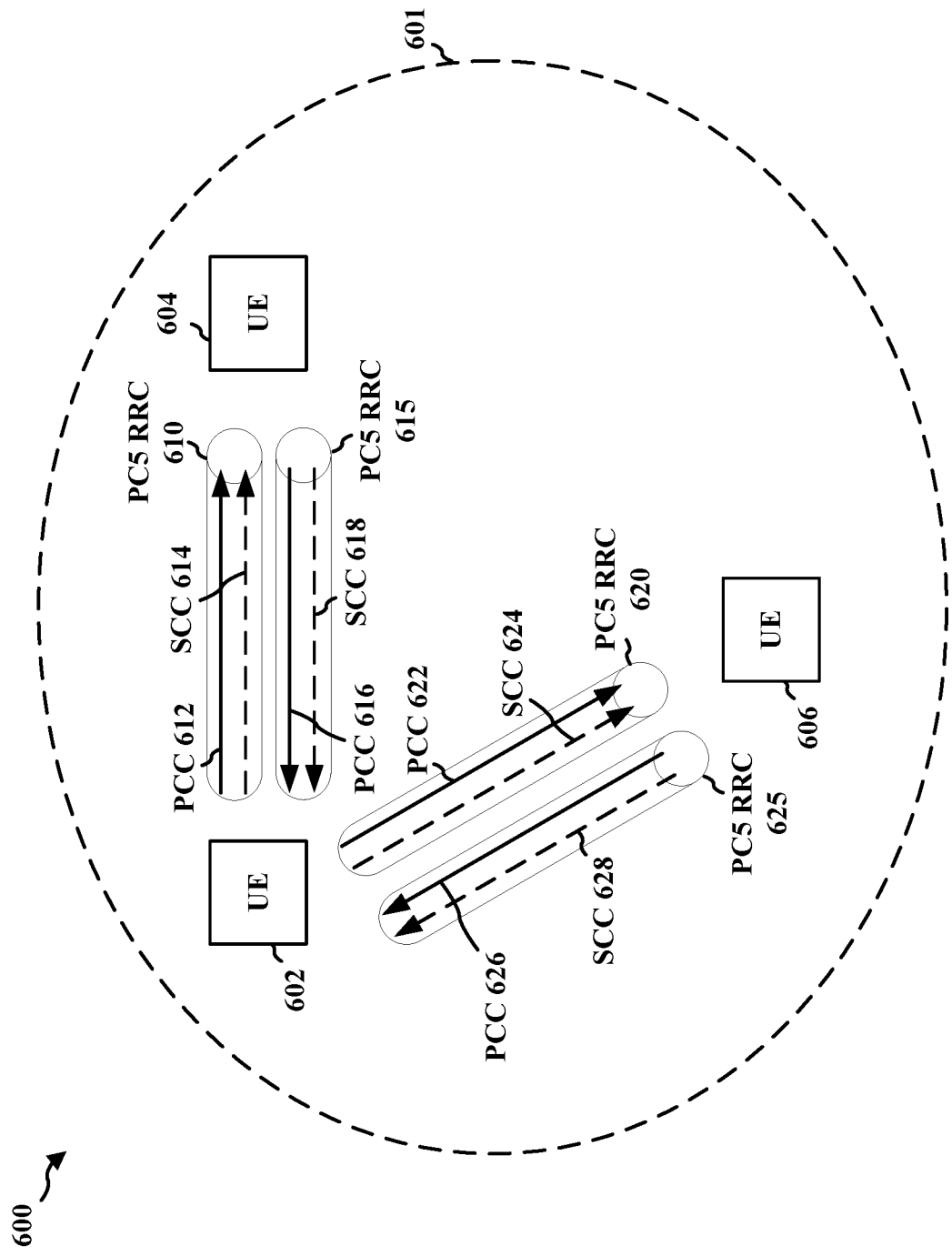
FIG. 6 is another diagram illustrating an example of UEs configured to have directional sidelink PCC for transmissions between the UE.

FIG. 6 illustrates an example 600 of sidelink communication between a UE 602, UE 604, and UE 606 within a range 601. Each of the UEs 602, 604, and 606 may be similar to the UEs 502, 504, and 506, where the UE 602 and the UE 604 may be configured to communicate using a PC5 RRC link 610 having a PCC 612 and a set of SCCs 614 from the UE 602 to the UE 604. The UEs 602 and 604 may also be configured to communicate using a PC5 RRC link 615 having a PCC 616 and a set of SCCs 618 from the UE 604 to the UE 602. In other words, the UEs 602 and 604 may be configured to have two separate one-way D2D links that allow the UE 602 to transmit sidelink transmissions to the UE 604 via the PC5 RRC link 610 and that allow the UE 604 to transmit sidelink transmissions to the UE 602 via the PC5 RRC link 615. However, the resources for used for PCC 612 may overlap with the resources used for PCC 616. In other words, the PCC 612 and the PCC 616 may share the same CCs and/or physical resources. The UE 602 and the UE 604 may be configured to not schedule simultaneous transmissions using the PCC 612 and the PCC 616 to minimize the likelihood of interference between the transmissions. However, since the PCC 612 and the PCC 616 may share resources (e.g., completely overlapping frequencies), measurements of the PCC 612 may be applied to configurations for the PCC 616 and vice versa.

Similarly, the UEs 602 and 606 may be configured to communicate using a PC5 RRC link 620 having a PCC 622 and a set of SCCs 624 from the UE 602 to the UE 604. The UEs 602 and 606 may be configured to communicate using a PC5 RRC link 625 having a PCC 626 and a set of SCCs 628 from the UE 606 to the UE 602. The resources used for PCC 622 may also overlap with the resources used for PCC 626. In other words, the PCC 622 and the PCC 626 may share the same CCs and/or physical resources. The resources used for PCC 622 may not overlap with the resources used for PCC 612.

A sidelink connection, such as the PC5 RRC links 510, 515, 520, or 525 in FIG. 5 or the PC5 RRC links 610, 615, 620, or 625 in FIG. 6 may be associated with carrier aggregation by aggregating a set of carriers into a component carrier (CC) to increase a bandwidth of a transmission in one direction. A CC may be intra-band contiguous, intra-band non-contiguous, or inter-band non-contiguous. A sidelink connection may be configured using a PCC configuration that designates one CC of a plurality of CCs for the sidelink connection to be a PCC of the sidelink connection, or the main carrier, and the rest of the CCs as a set of SCCs of the sidelink connection, or alternate carriers. A transmitting UE configured to send a transmission using a sidelink connection may use the aggregated carriers associated with a PCC for a transmission. A UE may perform a handover of a PCC identified as CC1 to an SCC identified as CC2 by deactivating CC1 from a PCC to an SCC of the sidelink connection, and then by activating CC2 from an SCC to a PCC of the sidelink connection. A sidelink PCC may be configured per UE, per link, or per link per direction in some aspects.

In one aspect, a sidelink PCC may be configured per UE. A coordinating UE may configure one CC as a PCC for all sidelink links that the coordinating UE establishes and/or participates in. To establish a new sidelink link to a new UE, the coordinating UE may negotiate with the new UE to ensure that the configured PCC may still act as a PCC for the new link (there are no conflicting sidelink transmissions that use the same resources as the PCC for the new link). In some aspects, the coordinating UE may negotiate with a base station or a third UE (e.g., an anchor and/or hub node in a star topology) to ensure that the configured PCC may still act as a PCC for the new link. The coordinating UE may be the transmitting UE (e.g., the UE 502 for PC5 RRC link 510 and the UE 504 for PC5 RRC link 515).

In another aspect, a sidelink PCC may be configured per link. When a sidelink link is established between a first UE and a second UE, a specific CC may be designated as a primary CC for that link. A base station or an anchor UE (i.e., a third UE) may designate the CC as a PCC for that link, or the first UE and the second UE may negotiate the CC as a PCC for that link to establish the link. The designated CC may be different SL links (e.g., PCC 512 in FIG. 5 may not have resources that overlap with PCC 516, and may not have resources that overlap with PCC 522) or may be the same (e.g., PCC 612 in FIG. 6 may have the same resources as the PCC 616), and may be different for unicast links versus groupcast links. A groupcast link may be treated by a coordinating device as multiple unicasts for the purpose of establishing a PCC. Each UE may have a different set of other CCs besides the PCC, for example the UE 502 in FIG. 5 may have a PCC 512 designated for transmissions to the UE 504, while the UE 504 may have a different PCC 516 designated for transmissions to the UE 502. Each UE may also index its CCs differently. For example, the UE 502 may index PCC 512 as CC0, while the UE 504 may index PCC 512 as CC16. The UEs may be configured to agree to a common indexing and/or referencing terminology when referring to a PCC so that they may understand an indication of a common PCC.

In another aspect, a sidelink PCC may be configured per link per direction. For example, each link may get two sidelink PCCs, one for a forward communication and one for a reverse direction. For example, for the UE 502, the PC5 RRC link 510 may have a PCC 512 for a forward communication from the UE 502 to the UE 504, and may have a PCC 516 for a reverse communication from the UE 504 to the UE 502. The different PCCs may be distinguished in any suitable manner. In one aspect, a PCC may be configured with a bidirectional forwarding detection (BFD) reference signal (RS). With a bidirectional BFR, the BFD RS from the UE 502 to the UE 504 may be on the PCC 512 while the BFD RS from the UE 504 to the UE 502 may be on the PCC 516. In another aspect, a PCC may be carrying PSFCH. In other words, the PCC 512 may carry PSFCH from the UE 504 to the UE 502 and the PCC 516 may carry PSFCH from the UE 502 to the UE 504.

While each of the PC5 RRC links 510, 515, 520, and 525 are shown as having a set of SCCs having a shared resource, in some aspects the PC5 RRC links may have a set of configured SCCs which may have different resources, allowing for a UE to select from a plurality of potential SCCs having different resources when assigning an SCC of a set of SCCs to be a new PCC for a sidelink connection. While SCCs may be added, removed, activated, and deactivated, special procedures may be defined to properly configure a D2D link, such as the PC5 RRC links, to activate an SCC as a PCC since sidelink UEs may not have a centralized network or base station that may manage and coordinate the sidelink transmissions. A PCC configuration may include a series of instructions to deactivate a PCC as an SCC, and activate an SCC as a PCC.

When configuring a PCC for sidelink transmissions, the sidelink PCC may be centered on a transmitting UE. A sidelink PCC may be defined, for example, per transmission UE per sidelink. In other words, two independent PC5 RRC connections may be established between a pair of UEs, each on an independent PCC. For example, the PCC 512 may be defined as a transmission link from the UE 502 to the UE 504, and the PCC 516 may be defined as a transmission link from the UE 504 to the UE 502. When a PCC is defined per transmission UE per sidelink, a radio link management system or a radio link failure system may be defined to manage and coordinate sidelink transmissions utilizing CA CCs. A UE may detect that a PCC RLF has occurred if the PCC of the sidelink connection is associated with an RLF value (e.g., a number of RLC retransmissions, a timer indicating a time that has elapsed since a transmission of a sidelink RRC reconfiguration for the sidelink connection, a number of consecutive hybrid automatic repeat request (HARQ) discontinuous transmissions (DTXs) for a destination of the sidelink connection) that meets or exceeds an RLF limit threshold. A UE that detects that a PCC RLF has occurred may deactivate the PCC of the sidelink connection and activate an SCC of the set of SCCs that is capable of maintaining the sidelink connection (e.g., the SCC has a measured RSRP value that meets or exceeds an RSRP threshold).

A first UE may be configured to establish a sidelink connection with at least one second UE via a first PCC or at least one second PCC. The first PCC and a first set of SCCs may be associated with a first transmission of the first UE. The at least one second PCC and at least one second set of SCCs may be associated with a second transmission of the at least one second UE. The sidelink connection with the at least one second UE may be associated with carrier aggregation. The first UE may be further configured to detect that at least one of (i) the sidelink connection is associated with an RLF value that is within an RLF threshold of an RLF limit, or (ii) at least one of the first set of SCCs or at least one of the at least one second set of SCCs is capable of maintaining the sidelink connection. The first UE may be further configured to transmit a first indication of at least one of (i) the sidelink connection being associated with the RLF value that is within the RLF threshold of the RLF limit, or (ii) the at least one of the first set of SCCs or the at least one of the at least one second set of SCCs being capable of maintaining the sidelink connection. The first UE may be further configured to receive, based on the first indication, a second indication of a switch of the sidelink connection from the first PCC to a first SCC of the first set of SCCs or from the at least one second PCC to at least a second SCC of the at least one second set of SCCs.

A second UE may be configured to establish a sidelink connection with at least one first UE via a first PCC or a second PCC. The at least one first PCC and at least one first set of SCCs may be associated with a first transmission of the at least one first UE. The second PCC and a second set of SCCs may be associated with a second transmission of the second UE. The sidelink connection with the at least one first UE may be associated with carrier aggregation. The second UE may be further configured to receive a first indication of at least one of (i) the sidelink connection being associated with an RLF value that is within an RLF threshold of an RLF limit, or (ii) at least one of the at least one first set of SCCs or at least one of the second set of SCCs being capable of maintaining the sidelink connection. The second UE may be further configured to switch, based on the first indication, the sidelink connection from the at least one first PCC to at least a first SCC of the first set of SCCs or from the second PCC to a second SCC of the second set of SCCs. The second UE may be further configured to transmit a second indication of the switch of the sidelink connection from the at least one first PCC to the at least the first SCC of the first set of SCCs or from the second PCC to the second SCC of the second set of SCCs.

Random access channel (RACH) measurements may be performed by the UE on the PCC per direction. For example, in FIG. 5, the UE 502 may measure RACH and/or RSRP on the PCC 516 and on the PCC 526, the UE 504 may measure RACH and/or RSRP on the PCC 512, and the UE 506 may measure RACH and/or RSRP on the PCC 522. Similarly, in FIG. 6, the UE 602 may measure RACH and/or RSRP on the PCC 616 and on the PCC 626, the UE 604 may measure RACH and/or RSRP on the PCC 612, and the UE 606 may measure RACH and/or RSRP on the PCC 622. The measurements may be reported back to the transmitting UE via sidelink. RLM and/or RLF may be declared on the PCC per direction. A UE may advertise its PCC information in the synchronization signal block (SSB) system information blocks (SIBs). For example, in FIG. 5, the UE 502 may advertise PCC information for the PCC 512 in the SSB SIBs as a notification to the UE 504, the UE 502 may advertise PCC information for the PCC 522 in the SSB SIBs as a notification to the UE 506, the UE 504 may advertise PCC information for the PCC 516 in the SSB SIBs as a notification to the UE 502, and the UE 506 may advertise PCC information for the PCC 526 in the SSB SIBs as a notification to the UE 502. Similarly, in FIG. 6, the UE 602 may advertise PCC information for the PCC 612 in the SSB SIBs as a notification to the UE 604, the UE 602 may advertise PCC information for the PCC 622 in the SSB SIBs as a notification to the UE 606, the UE 604 may advertise PCC information for the PCC 616 in the SSB SIBs as a notification to the UE 602, and the UE 606 may advertise PCC information for the PCC 626 in the SSB SIBs as a notification to the UE 602.

A UE may be configured to update a PCC configuration of the sidelink link by transmitting an update to a PCC configuration to the other UE participating in the sidelink link. For example, the UE 502 may be configured to transmit, to the UE 504, an update for the PCC configuration of the PC5 RRC link 510 to designate an SCC of the set of SCCs 514 as the new PCC for the PC5 RRC link 510. In response, the UE 504 may switch the sidelink connection from the PCC 512 to the designated SCC of the set of SCCs 514 in the update, or may fail to switch the sidelink connection from the PCC 512 to the designated SCC of the set of SCCs 514 in the update. The UE 504 may then transmit an indication of the successful switch to the UE 502 or may transmit an indication of an RLF of the failure to switch the sidelink connection. In another aspect, the UE 502 may be configured to transmit, to the UE 504, an update for the PCC configuration of the PC5 RRC link 515 to designate an SCC of the set of SCCs 518 as the new PCC for the PC5 RRC link 515. In response, the UE 504 may switch the sidelink connection from the PCC 516 to the designated SCC of the set of SCCs 518 in the update, or may fail to switch the sidelink connection from the PCC 516 to the designated SCC of the set of SCCs 518 in the update. The UE 504 may then transmit an indication of the successful switch to the UE 502 or may transmit an indication of an RLF of the failure to switch the sidelink connection. Such updates and switches may also be configured to be transmitted in the opposing direction. In some aspects, the receiving UE may not be authorized to initiate the switch, but may be authorized to transmit an update as a request for the transmitting UE to switch.

Figure 7:
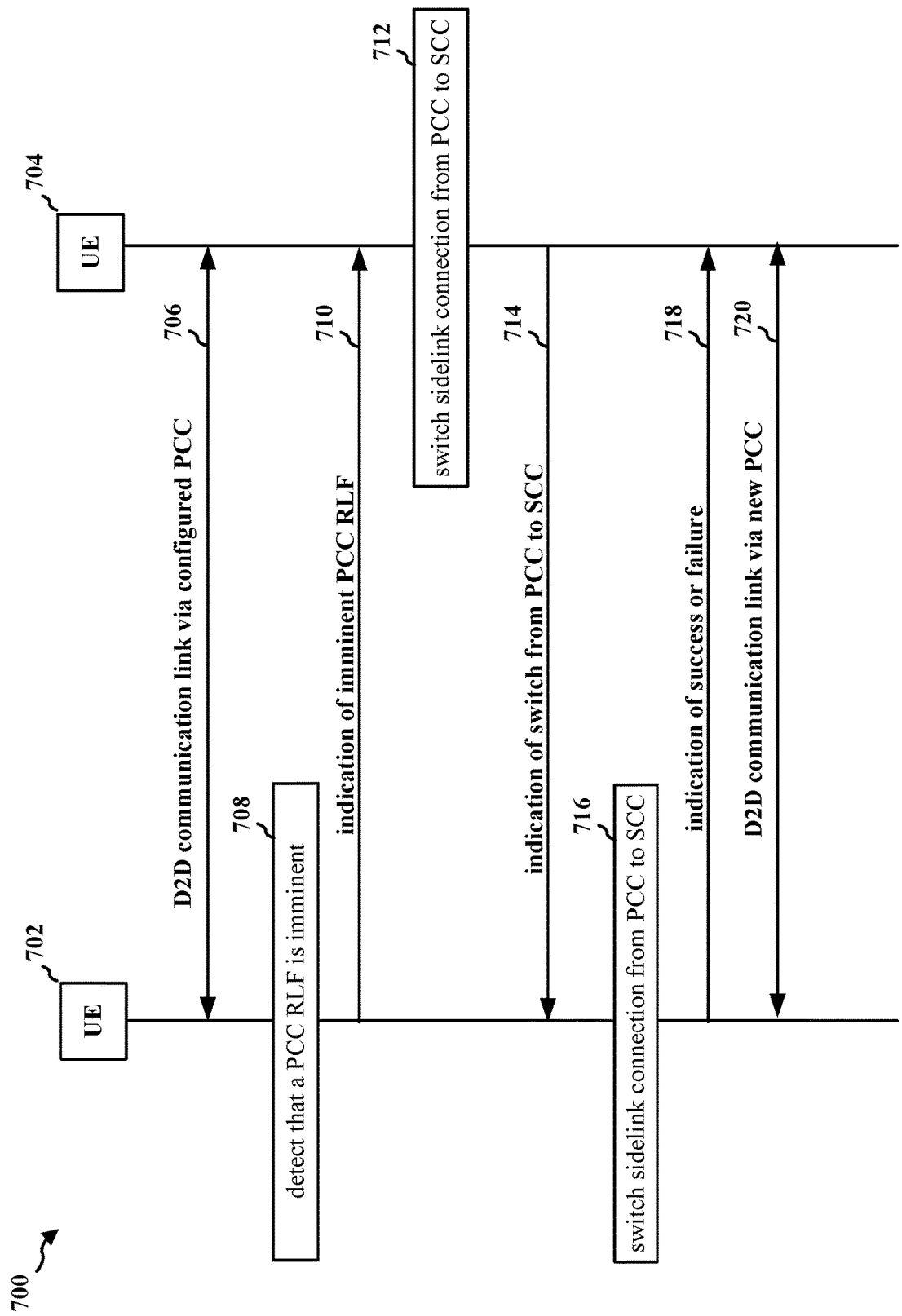
FIG. 7 is a connection flow diagram illustrating a radio link management system between two UEs communicating via a D2D communication link.

FIG. 7 illustrates a connection flow diagram 700 illustrating a radio link management system between a UE 702 and a UE 704, for example the UE 502 and the UE 504 in FIG. 5 or the UE 602 and the UE 604 in FIG. 6. The UEs 702 and 704 may be configured to exchange sidelink transmissions with each other using a D2D communication link 706 via configured PCC. For example, in FIG. 5, the UE 502 may exchange sidelink transmissions with the UE 504 using the PC5 RRC link 510 with a PCC 512 used to transmit sidelink transmissions from the UE 502 to the UE 504 and may exchange sidelink transmissions with the UE 504 using the PCC 516 used to transmit sidelink transmissions from the UE 504 to the UE 502. The CCs may be configured in any suitable manner, for example per link per direction, by the UE 502 and the UE 504. The UE 702 may be configured to transmit a notification of a PCC being associated with the UE 702 and the UE 704 may be configured to transmit a notification of a PCC being associated with the UE 704. The notifications may be transmitted in a set of synchronization signal block (SSB) system information blocks (SIBs) in either direction.

At 708, the UE 702 may detect that a PCC RLF is imminent by detecting if the sidelink connection is associated with an RLF value that is within an RLF threshold of an RLF limit. The UE 702 may detect that a PCC RLF has occurred if the sidelink connection is associated with an RLF value that meets or exceeds the RLF limit. An RLF value may be, for example, a number of RLC retransmissions, a timer indicating a time that has elapsed since a transmission of a sidelink RRC reconfiguration for the sidelink connection, or a number of consecutive hybrid automatic repeat request (HARQ) discontinuous transmissions (DTXs) for a destination of the sidelink connection. The UE 702 may be configured to detect that an RLF is imminent on a PCC from the UE 702 to the UE 704 or on a PCC from the UE 704 to the UE 702.

For example, the UE 702 may detect that a PCC is approaching a maximum number of RLC retransmissions (e.g., Nmax) by detecting that the number of RLC retransmissions is within a threshold number of the maximum number of RLC retransmissions (e.g., within 5 retransmissions or within 10 retransmissions). In one aspect, the UE 702 may be configured to detect an nth percentile of a maximum configured RLC retransmission value, where n may be configured by an RRC (e.g., 90% of Nmax). In another embodiment, the UE 702 may have a defined threshold Nmax1 that triggers an imminent PCC RLF condition that a PCC RLF is imminent where Nmax1<Nmax, and Nmax is the maximum number of RLC transmissions.

In another embodiment, the UE 702 may detect that a PCC is approaching the expiry of a sidelink T400 timer (e.g., T400 Max). For example, the UE 702 may start a timer after a transmission of a sidelink RRC reconfiguration for the sidelink transmission has been sent or received, may have an expiration time that corresponds with the RRC reconfiguration, and may detect that the timer is within a threshold number of the expiry of the sidelink T400 timer (e.g., within 5 seconds or within 10 seconds). The UE 702 may be configured to detect an nth percentile of the maximum configured value for the T400 timer (e.g., 90% of T400_Max), where n may be configured by an RRC. When the timer reaches such a threshold value without reception/transmission of an indicator of a success or a failure of the RRC reconfiguration for the sidelink transmission, the UE 702 may trigger an imminent PCC RLF condition.

In another embodiment, the UE 702 may detect that a PCC is approaching a maximum number of consecutive HARQ DTXs for a specific destination (e.g., an H_Dtx_Max value) by detecting that the number of consecutive HARQ DTXs is within a threshold number of the maximum number (e.g., within 5 consecutive HARQ DTXs of the H_Dtx_Max value). The UE 702 may be configured to detect an nth percentile of the H_Dtx_Max (e.g., 90% of the H_Dtx_Max), where n may be configured by an RRC. In another embodiment, the UE 702 may have a defined threshold H_Dtx_Max1 that triggers an imminent PCC RLF condition that a PCC RLF is imminent where H_Dtx_Max1<H_Dtx_Max, and H_Dtx_Max is the maximum number of consecutive HARQ DTXs.

The UE 702 may be configured to transmit an indication 710 of an imminent PCC RLF to the UE 704, for example by transmitting a measured RLF value that is approaching the RLF limit, by transmitting an indication that an RLF value for the PCC may be approaching the RLF limit, by transmitting an indication that an RLF value has reached an RLF threshold of an RLF limit, or by transmitting an update for the PCC configuration for the D2D communication link 706 for a set of SCCs of the D2D communication link 706. The update may include a selection of a suitable or favored SCC from the set of SCCs to designate as the new PCC.

In some aspects, if there are multiple D2D communication links between a pair of UEs that are on the same CCs and/or physical resources, an imminent RLF detected on one PCC may trigger an imminent RLF detected on another PCC. For example, in FIG. 6, where the PC5 RRC link 610 has a PCC 612 that uses the same CCs as the PC5 RRC link 615, an imminent RLF detected on the PCC 612 may trigger an imminent RLF detected on the PCC 616, or an imminent RLF detected on the PCC 616 may trigger an imminent RLF detected on the PCC 612. In other words, in FIG. 6, between UE 602 and UE 604, when RLF is detected on PC5 RRC link 610 and/or PC5 RRC link 615, based on channel reciprocity, it is possible to perform measurements associated with relay reselection and/or PCC change procedures on one of PC5 RRC link 610 or PC5 RRC link 615 and share the measurement to the other PC5 RRC link. Such measurements may apply to any suitable RLF value, such as a number of RLC retransmissions, a time since a transmission of a sidelink RRC reconfiguration for the sidelink connection, or a number of consecutive HARQ DTXs for a destination of the sidelink connection. One or more measurements of one sidelink link between the UE 702 and the UE 704 may be correlated or synchronized with one or more measurements of another sidelink link between the UE 702 and the UE 704 in the opposing direction if the sidelink links share resources. If the RLF value is a time since a transmission of a sidelink RRC reconfiguration for the sidelink connection, the timers for each UE may operate in a correlated or synchronized manner relative to one another. For example, when a timer in one direction has started, the timer in the opposite direction may be activated and incremented.

In some aspects, the UE 702 may be configured to transmit an indication 710 of an imminent PCC RLF to the UE 704 for two PCCs of D2D communication links between the UE 702 and the UE 704 instead of just one, or the UE 704 may interpret an indication 710 of an imminent PCC RLF to the UE for one PCC of a D2D communication link to be two imminent PCC RLFs, one for each PCC that correlates with one another (e.g., the PCCs share the same resource).

At 712, in response, the UE 704 may be configured to switch a sidelink connection from a PCC to an SCC. For example, in FIG. 5, in response to the UE 504 receiving an indication from the UE 502 that the PCC 512 has an RLF value that has reached an RLF threshold of an RLF limit, the UE 504 may switch the PC5 RRC link 510 from the PCC 512 to an SCC of the set of SCCs 514. In another aspect, in response to the UE 504 receiving an indication from the UE 502 that the PCC 516 has an RLF value that has reached an RLF threshold of an RLF limit, the UE 504 may switch the PC5 RRC link 515 from the PCC 516 to an SCC of the set of SCCs 518.

The UE 704 may transmit an indication 714 of the switch from the PCC to the SCC to the UE 702. The trigger from the UE 704 to the UE 702 to activate a preconfigured SCC as the PCC may be done using a MAC-CE or SCI2 level indication. In other words, the indication 714 may be transmitted in a MAC-CE transmission or an SCI transmission. The indication 714 may include an update for the PCC configuration for the D2D communication link 706 for a set of SCCs of the D2D communication link 706. The update may include a selection of the SCC of the set of SCCs that the UE 704 has designated as the new PCC at 712. At 716, in response to receiving the indication 714 of the switch from the PCC to the SCC, the UE 702 may switch the sidelink connection from the PCC to the SCC. For example, in FIG. 5, in response to the UE 502 receiving an indication from the UE 704 that the PC5 RRC link 510 has been switched from the PCC 512 to an SCC of the set of SCCs 514, the UE 502 may switch from the PCC 512 to the SCC of the set of SCCs 514. In another aspect, in response to the UE 502 receiving an indication from the UE 704 that the PC5 RRC link 515 has been switched from the PCC 516 to an SCC of the set of SCCs 518, the UE 502 may switch from the PCC 516 to the SCC of the set of SCCs 518.

The UE 702 may transmit an indication 718 of success or failure to the UE 704 of its switch from the PCC to the SCC. If the PCC change is not possible, then the UE 702 may declare an RLF for the PCC. The PCC may carry the joint control information (e.g., SCI2 of both the PCC and the SCC), hence the sidelink connection may not be able to survive without the PCC. The UE 704 may then determine that the sidelink connection has failed, indicating a new sidelink connection to be initialized before the UE 702 and the UE 704 may communicate with one another using a D2D communication link.

In response to the UE 704 receiving an indication 718 of success from the UE 702, the UE 704 may determine that the sidelink switch from the PCC to the SCC has succeeded, and the UE 702 and the UE 704 may exchange sidelink transmissions with each other using a D2D communication link 720 via the newly configured PCC.

Figure 8:
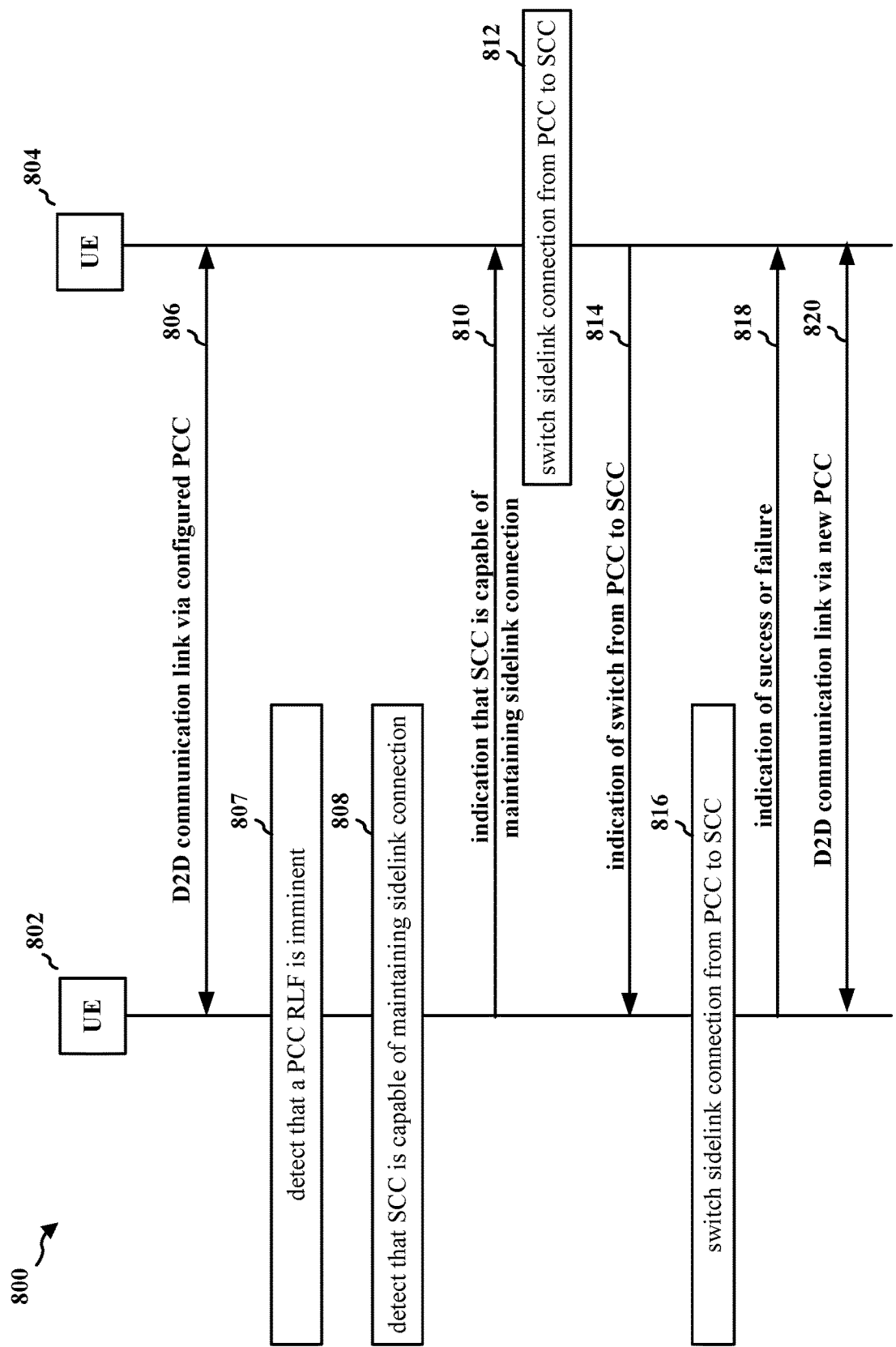
FIG. 8 is another connection flow diagram illustrating a radio link management system between two UEs communicating via a D2D communication link.

FIG. 8 illustrates a connection flow diagram 800 illustrating a radio link management system between a UE 802 and a UE 804, for example such as the UE 502 and the UE 504 in FIG. 5 or the UE 602 and the UE 604 in FIG. 6. The UEs 802 and 804 may be configured to exchange sidelink transmissions with each other using a D2D communication link 806 via configured PCC. For example, in FIG. 5, the UE 502 may exchange sidelink transmissions with the UE 504 using the PC5 RRC link 510 with a PCC 512 used to transmit sidelink transmissions from the UE 502 to the UE 504 and the PCC 516 used to transmit sidelink transmissions from the UE 504 to the UE 502. The CCs may be configured in any suitable manner, for example per link per direction, by the UE 502 and the UE 504. The UE 802 may be configured to transmit a notification of a PCC being associated with the UE 802 and the UE 804 may be configured to transmit a notification of a PCC being associated with the UE 804. The notifications may be transmitted in a set of synchronization signal block (SSB) system information blocks (SIBs).

At 807, the UE 802 may detect that a PCC RLF is imminent by detecting if the sidelink connection is associated with an RLF value that is within an RLF threshold of an RLF limit. The UE 802 may detect that a PCC RLF has occurred if the sidelink connection is associated with an RLF value that meets or exceeds the RLF limit. An RLF value may be, for example, a number of RLC retransmissions, a timer indicating a time that has elapsed since a transmission of a sidelink RRC reconfiguration for the sidelink connection, or a number of consecutive hybrid automatic repeat request (HARQ) discontinuous transmissions (DTXs) for a destination of the sidelink connection. The UE 802 may be configured to detect that an RLF is imminent on a PCC from the UE 802 to the UE 804 or on a PCC from the UE 804 to the UE 802.

For example, the UE 802 may detect that a PCC is approaching a maximum number of RLC retransmissions (e.g., Nmax) by detecting that the number of RLC retransmissions is within a threshold number of the maximum number of RLC retransmissions (e.g., within 5 retransmissions or within 10 retransmissions). In one aspect, the UE 802 may be configured to detect an nth percentile of a maximum configured RLC retransmission value, where n may be configured by an RRC (e.g., 90% of Nmax). In another embodiment, the UE 802 may have a defined threshold Nmax1 that triggers an imminent PCC RLF condition that a PCC RLF is imminent where Nmax1<Nmax, and Nmax is the maximum number of RLC transmissions.

In another embodiment, the UE 802 may detect that a PCC is approaching the expiry of a sidelink T400 timer (e.g., T400 Max). For example, the UE 802 may start a timer after a transmission of a sidelink RRC reconfiguration for the sidelink transmission has been sent or received, may have an expiration time that corresponds with the RRC reconfiguration, and may detect that the timer is within a threshold number of the expiry of the sidelink T400 timer (e.g., within 5 seconds or within 10 seconds). The UE 802 may be configured to detect an nth percentile of the maximum configured value for the T400 timer (e.g., 90% of T400_Max), where n may be configured by an RRC. When the timer reaches such a threshold value without reception/transmission of an indicator of a success or a failure of the RRC reconfiguration for the sidelink transmission, the UE 802 may trigger an imminent PCC RLF condition.

In another embodiment, the UE 802 may detect that a PCC is approaching a maximum number of consecutive HARQ DTXs for a specific destination (e.g., an H_Dtx_Max value) by detecting that the number of consecutive HARQ DTXs is within a threshold number of the maximum number (e.g., within 5 consecutive HARQ DTXs of the H_Dtx_Max value). The UE 802 may be configured to detect an nth percentile of the H_Dtx_Max (e.g., 90% of the H_Dtx_Max), where n may be configured by an RRC. In another embodiment, the UE 802 may have a defined threshold H_Dtx_Max1 that triggers an imminent PCC RLF condition that a PCC RLF is imminent where H_Dtx_Max1<H_Dtx_Max, and H_Dtx_Max is the maximum number of consecutive HARQ DTXs.

In some aspects, if there are multiple D2D communication links between a pair of UEs that are on the same CCs and/or physical resources, an imminent RLF detected on one PCC may trigger an imminent RLF detected on another PCC. For example, in FIG. 6, where the PC5 RRC link 610 has a PCC 612 that uses the same CCs as the PC5 RRC link 615, an imminent RLF detected on the PCC 612 may trigger an imminent RLF detected on the PCC 616, or an imminent RLF detected on the PCC 616 may trigger an imminent RLF detected on the PCC 612. In other words, in FIG. 6, between UE 602 and UE 604, when RLF is detected on PC5 RRC link 610 and/or PC5 RRC link 615, based on channel reciprocity, it is possible to perform measurements associated with relay reselection and/or PCC change procedures on one of PC5 RRC link 610 or PC5 RRC link 615 and share the measurement to the other PC5 RRC link. Such measurements may apply to any suitable RLF value, such as a number of RLC retransmissions, a time since a transmission of a sidelink RRC reconfiguration for the sidelink connection, or a number of consecutive HARQ DTXs for a destination of the sidelink connection. One or more measurements of one sidelink link between the UE 802 and the UE 804 may be correlated or synchronized with one or more measurements of another sidelink link between the UE 802 and the UE 804 in the opposing direction if the sidelink links share resources. If the RLF value is a time since a transmission of a sidelink RRC reconfiguration for the sidelink connection, the timers for each UE may operate in a correlated or synchronized manner relative to one another. For example, when a timer in one direction has started, the timer in the opposite direction may be activated and incremented.

At 808, the UE 802 may detect that an SCC is capable of maintaining a sidelink connection by detecting if the reference signal received quality (RSRP) values of the SCC meet or exceed a threshold value. The threshold value may be configured by RRC. The UE 802 may preemptively provide a PCC configuration for a chosen SCC as the PCC with a PC5-RRC reconfiguration message, but keep the chosen SCC inactive. For example, in FIG. 5, the UE 802 may measure RSRP values of the set of SCCs 514 to determine if they meet or exceed a threshold value. In response to determining that one or more RSRP values of the SCC 514 meet or exceed a threshold value, the UE 802 may transmit an indication 810 to the UE 804 that a subset of the set of SCCs 514 is capable of maintaining a sidelink connection. In some aspects, the indication 810 may include a PCC configuration for the chosen SCC. In some aspects, the UE 802 may monitor a plurality of SCCs, and may select an SCC for PCC change based on a channel quality (e.g., selects the SCC having the highest measured RSRP values).

In another aspect, the UE 802 may measure RSRP values of the set of SCCs 518 to determine if they meet or exceed a threshold value. In response to determining that one or more RSRP values of the set of SCCs 518 meet or exceed a threshold value, the UE 802 may transmit an indication 810 to the UE 804 that a subset of the set of SCCs 518 is capable of maintaining a sidelink connection. In some aspects, the indication 810 may include an update for the PCC configuration for the D2D communication link 806 for a set of SCCs of the D2D communication link 806. The update may include a selection of a suitable, favored, and/or selected SCC from the set of SCCs to designate as the new PCC. In some aspects, the UE 802 may monitor a plurality of SCCs, and may select an SCC for PCC change based on a channel quality (e.g., selects the SCC having the highest measured RSRP values).

At 812, the UE 804 may switch a sidelink connection from the PCC to the SCC. In some aspects, the UE 804 may switch the sidelink connection in response to a received indication, such as the indication 710 of an imminent PCC RLF in FIG. 7. In some aspects, the UE 804 may switch a side link connection from the PCC to the SCC in response to detecting a trigger condition, for example by detecting that one or more RSRP values for the PCC meets or falls below an RSRP threshold. In response to detecting that one or more RSRP values for the PCC meets for falls below the RSRP threshold, the UE 804 may switch the sidelink connection from the PCC to the SCC at 812 by initiating the PCC change procedure. For example, in FIG. 5, in response to the UE 504 detecting that one or more RSRP values for the PCC 512 meets or falls below an RSRP threshold value, the UE 504 may switch the sidelink connection from the PCC 512 to an SCC of the set of SCCs 514. An update to the PCC configuration for the set of SCCs 514 may have been provided to the UE 504 by the UE 502 as the indication 810 that the SCC is capable of maintaining the sidelink connection. In another aspect, in response to the UE 504 detecting that one or more RSRP values for the PCC 516 meets or falls below an RSRP threshold value, the UE 504 may switch the sidelink connection from the PCC 516 to an SCC of the set of SCCs 518. The PCC configuration for the PCC 516 may have been provided to the UE 504 by the UE 502 as the indication 810 that the SCC is capable of maintaining the sidelink connection.

The UE 804 may transmit an indication 814 of the switch from the PCC to the SCC to the UE 802. The trigger from the UE 804 to the UE 802 to activate a preconfigured SCC as the PCC may be done using a MAC-CE or SCI2 level indication. In other words, the indication 814 may be transmitted in a MAC-CE transmission or an SCI transmission. The indication 814 may include an update for the PCC configuration for the D2D communication link 806 for a set of SCCs of the D2D communication link 806. The update may include a selection of the SCC of the set of SCCs that the UE 804 has designated as the new PCC at 812.

At 816, in response to receiving the indication 814 of the switch from the PCC to the SCC, the UE 802 may switch the sidelink connection from the PCC to the SCC. For example, in FIG. 5, in response to the UE 502 receiving an indication from the UE 804 that the PC5 RRC link 510 has been switched from the PCC 512 to an SCC of the set of SCCs 514, the UE 502 may switch from the PCC 512 to the SCC of the set of SCCs 514. In another aspect, in response to the UE 502 receiving an indication from the UE 804 that the PC5 RRC link 515 has been switched from the PCC 516 to an SCC of the set of SCCs 518, the UE 502 may switch from the PCC 516 to the SCC of the set of SCCs 518.

The UE 802 may transmit an indication 818 of success or failure to the UE 804 of its switch from the PCC to the SCC. If the PCC change is not possible, then the UE 802 may declare an RLF for the PCC. The PCC may carry the joint control information (e.g., SCI2 of both the PCC and the SCC), hence the sidelink connection may not be able to survive without the PCC. The UE 804 may then determine that the sidelink connection has failed, indicating a new sidelink connection to be initialized before the UE 802 and the UE 804 may communicate with one another using a D2D communication link.

In response to the UE 804 receiving an indication 818 of success from the UE 802, the UE 804 may determine that the sidelink switch from the PCC to the SCC has succeeded, and the UE 802 and the UE 804 may exchange sidelink transmissions with each other using a D2D communication link 820 via the newly configured PCC.

Figure 9:
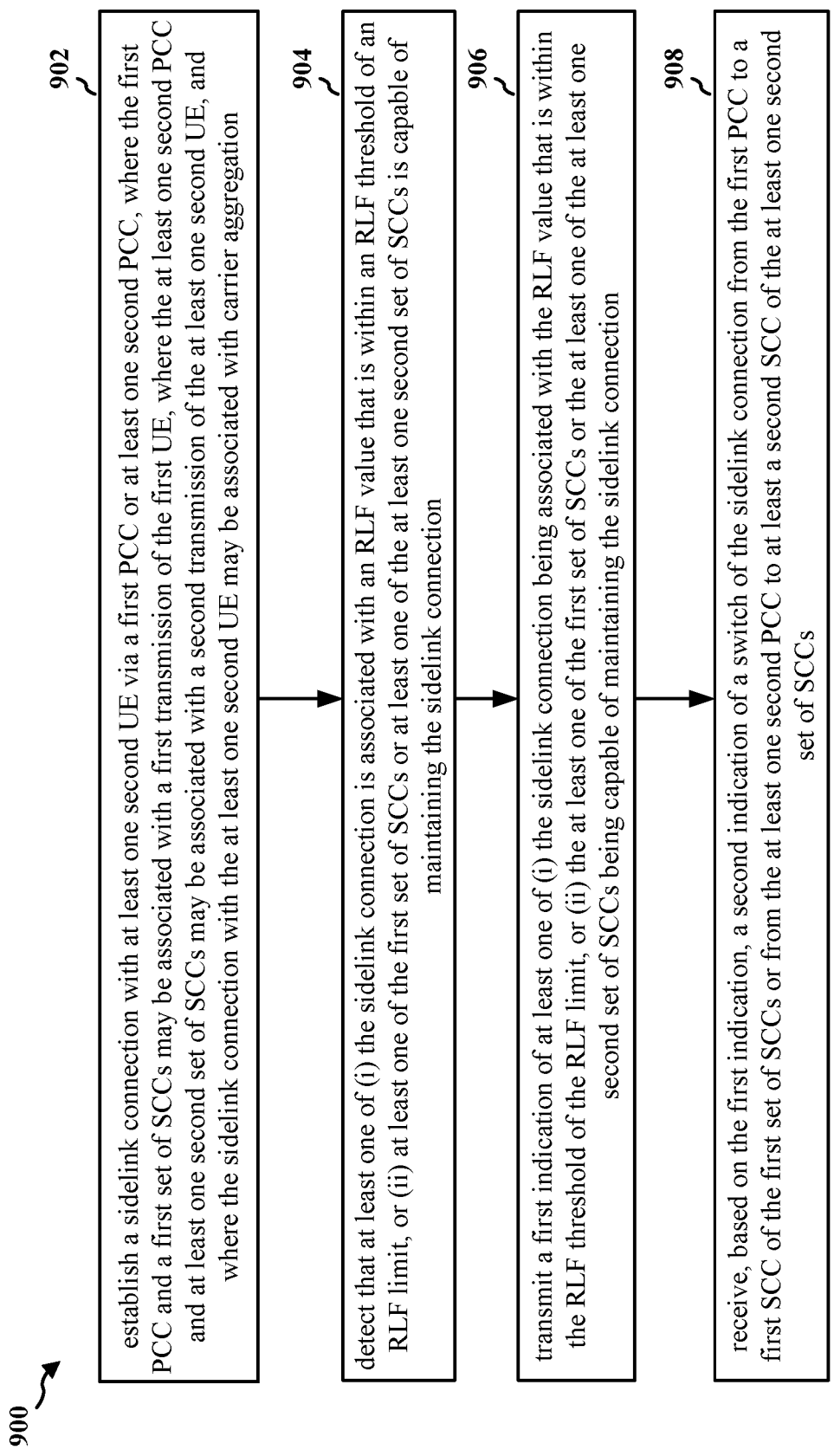
FIG. 9 is a flowchart of a method of wireless communication.

FIG. 9 is a flowchart 900 of a method of wireless communication. The method may be performed by a UE (e.g., UE 104, UE 502, UE 504, UE 506, UE 602, UE 604, UE 606, UE 702, UE 704, UE 802, UE 804; wireless communication device 310, wireless communication device 350; apparatus 1104). At 902, the UE may establish a sidelink connection with at least one second UE via a first PCC or at least one second PCC. The first PCC and a first set of SCCs may be associated with a first transmission of the first UE. The at least one second PCC and at least one second set of SCCs may be associated with a second transmission of the at least one second UE. The sidelink connection with the at least one second UE may be associated with carrier aggregation. For example, 902 may be performed by the UE 502 in FIG. 5, which may establish a PC5 RRC link 510 with the UE 504 via the PCC 512, or may establish a PC5 RRC link 515 with the UE 504 via the PCC 516. The PCC 512 and the set of SCCs 514 may be associated with a transmission sent from the UE 502 to the UE 504 as a transmission may be sent to the UE 504 from the UE 502 using the PCC 512 or the set of SCCs 514. The PCC 516 and the set of SCCs 518 may be associated with a transmission of the UE 504 to the UE 502 as a transmission may be sent to the UE 502 via the PCC 516 or the set of SCCs 518. The PC5 RRC link 510 may be associated with carrier aggregation of a PCC 512 and a set of SCCs 514. The RRC link 515 may be associated with carrier aggregation of a PCC 516 and a set of SCCs 518. Moreover, 902 may be performed by component 198 in FIG. 11.

At 904, the UE may detect that at least one of (i) the sidelink connection is associated with an RLF value that is within an RLF threshold of an RLF limit, or (ii) at least one of the first set of SCCs or at least one of the at least one second set of SCCs is capable of maintaining the sidelink connection. For example, 904 may be performed by the UE 502 in FIG. 5, which may detect that the PCC 512 of the PC5 RRC link 510 is associated with an RLF value that is within an RLF threshold of an RLF limit, such as a number of RLC retransmissions, a timer indicating a time that has elapsed since a transmission of a sidelink RRC reconfiguration for the sidelink connection, or a number of consecutive HARQ DTXs for a destination of the sidelink connection. The UE 502 may also detect that the PCC 516 of the PC5 RRC link 515 is associated with an RLF value that is within an RLF threshold of an RLF limit. The UE 502 may also determine if at least one of the set of SCCs 514 is capable of maintaining the PC5 RRC link 510. The UE 502 may also determine if at least one of the set of SCCs 518 is capable of maintaining the PC5 RRC link 515. Moreover, 904 may be performed by component 198 in FIG. 11.

At 906, the UE may transmit a first indication of at least one of (i) the sidelink connection being associated with the RLF value that is within the RLF threshold of the RLF limit, or (ii) the at least one of the first set of SCCs or the at least one of the at least one second set of SCCs being capable of maintaining the sidelink connection. For example, 906 may be performed by UE 502 in FIG. 5, which may transmit an indication that the PCC 512 of the PC5 RRC link 510 is associated with an RLF value that is within the RLF threshold of the RLF limit. The UE 502 may also transmit an indication that the PCC 516 of the PC5 RRC link 515 is associated with an RLF value that is within the RLF threshold of the RLF limit. The UE 502 may also transmit an indication that a subset of SCCs of the set of SCCs 514 is capable of maintaining the PC5 RRC link 510. The UE 502 may also transmit an indication that a subset of SCCs of the set of SCCs 518 is capable of maintaining the PC5 RRC link 515. Moreover, 906 may be performed by component 198 in FIG. 11.

Finally, at 908, the UE may receive, based on the first indication, a second indication of a switch of the sidelink connection from the first PCC to a first SCC of the first set of SCCs or from the at least one second PCC to at least a second SCC of the at least one second set of SCCs. For example, 908 may be performed by the UE 502 in FIG. 5, which may receive, based on the first indication, an indication of a switch of the PC5 RRC link 510 from the PCC 512 to an SCC of the set of SCCs 514. The UE 502 may also receive based on the first indication, an indication of a switch of the PC5 RRC link 515 from the PCC 516 to an SCC of the set of SCCs 518. Moreover, 908 may be performed by component 198 in FIG. 11.

Figure 10:
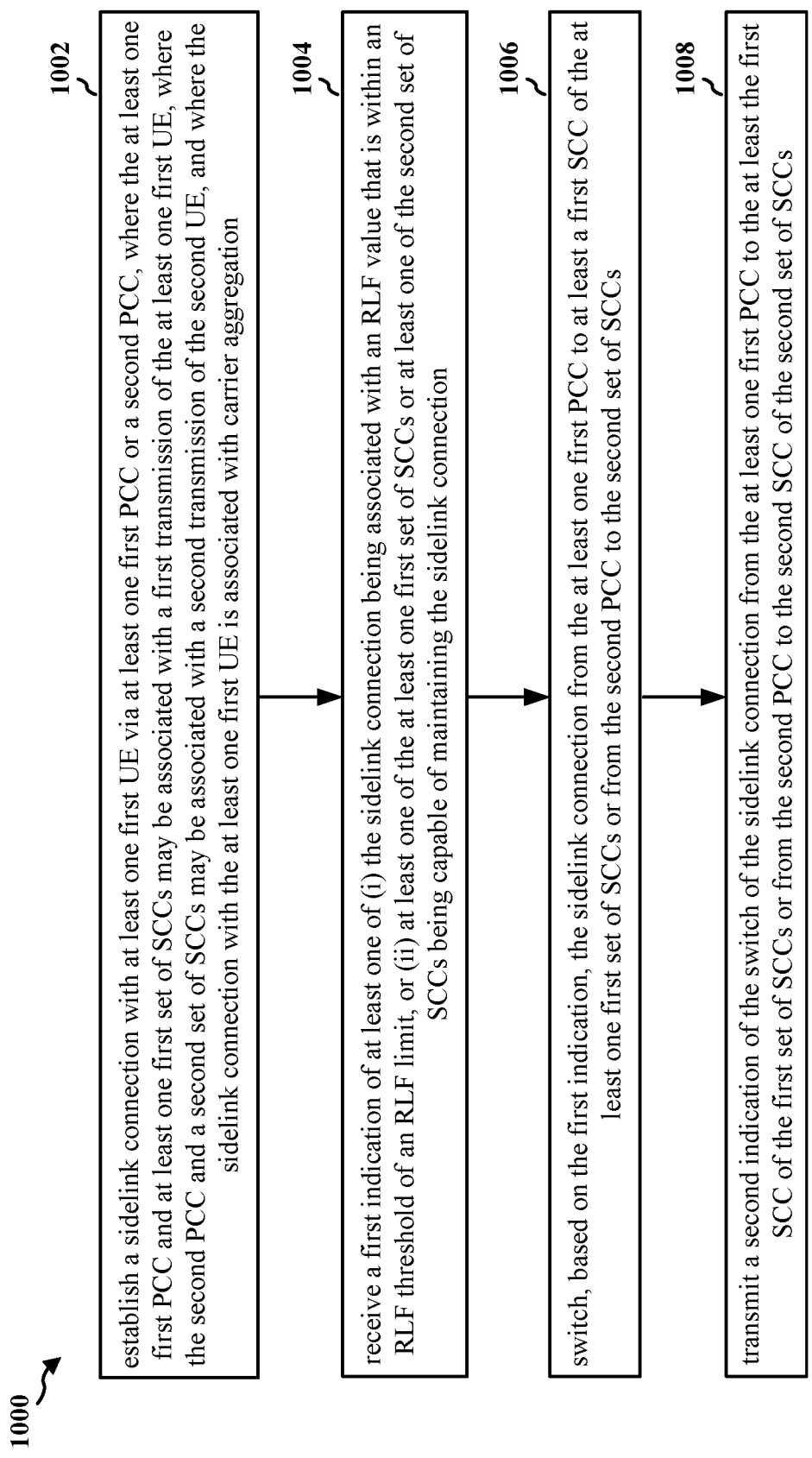
FIG. 10 is another flowchart of a method of wireless communication.

FIG. 10 is a flowchart 1000 of a method of wireless communication. The method may be performed by a UE (e.g., UE 104, UE 502, UE 504, UE 506, UE 602, UE 604, UE 606, UE 702, UE 704, UE 802, UE 804; wireless communication device 310, wireless communication device 350; apparatus 1104). At 1002, the UE may establish a sidelink connection with at least one first UE via at least one first PCC or a second PCC. The at least one first PCC and at least one first set of SCCs may be associated with a first transmission of the at least one first UE. The second PCC and a second set of SCCs may be associated with a second transmission of the second UE. The sidelink connection with the at least one first UE may be associated with carrier aggregation. For example, 1002 may be performed by the UE 504 in FIG. 5, which may establish a PC5 RRC link 510 with the UE 502 via the PCC 512. The UE 504 may establish a PC5 RRC link 515 with the UE 502 via the PCC 516. The PCC 512 and the set of SCCs 514 may be associated with a transmission sent from the UE 502 to the UE 504 as a transmission may be sent to the UE 504 from the UE 502 using the PCC 512 or the set of SCCs 514. The PCC 516 and the set of SCCs 518 may be associated with a transmission of the UE 504 to the UE 502 as a transmission may be sent to the UE 502 via the PCC 516 or the set of SCCs 518. The PC5 RRC link 510 may be associated with carrier aggregation of a PCC 512 and a set of SCCs 514. The RRC link 515 may be associated with carrier aggregation of a PCC 516 and a set of SCCs 518. Moreover, 1002 may be performed by component 199 in FIG. 11.

At 1004, the UE may receive a first indication of at least one of (i) the sidelink connection being associated with an RLF value that is within an RLF threshold of an RLF limit, or (ii) at least one of the at least one first set of SCCs or at least one of the second set of SCCs being capable of maintaining the sidelink connection. For example, 1004 may be performed by the UE 504 in FIG. 5, which may receive an indication that the PCC 512 of the PC5 RRC link 510 is associated with an RLF value that is within an RLF threshold of an RLF limit, such as a number of RLC retransmissions, a timer indicating a time that has elapsed since a transmission of a sidelink RRC reconfiguration for the sidelink connection, or a number of consecutive HARQ DTXs for a destination of the sidelink connection. The UE 504 may also receive an indication that the PCC 516 of the PC5 RRC link 515 is associated with an RLF value that is within an RLF threshold of an RLF limit. The UE 504 may also receive an indication that a subset of the set of SCCs 514 is capable of maintaining the PC5 RRC link 510. The UE 502 may also receive an indication that a subset of the set of SCCs 518 is capable of maintaining the PC5 RRC link 515. Moreover, 1004 may be performed by component 199 in FIG. 11.

At 1006, the UE may switch, based on the first indication, the sidelink connection from the at least one first PCC to at least a first SCC of the at least one first set of SCCs or from the second PCC to the second set of SCCs. For example, 1006 may be performed by the UE 504, which may switch, based on the first indication, the PC5 RRC link 510 from the PCC 512 to an SCC of the set of SCCs 514. The UE 504 may switch, based on the first indication, the PC5 RRC link 515 from the PCC 516 to an SCC of the set of SCCs 518. Moreover, 1006 may be performed by component 199 in FIG. 11.

Finally, at 1008, the UE may transmit a second indication of the switch of the sidelink connection from the at least one first PCC to the at least the first SCC of the first set of SCCs or from the second PCC to the second SCC of the second set of SCCs. For example, 1008 may be performed by the UE 504 in FIG. 5, which may transmit a second indication of the switch of the PC5 RRC link 510 from the PCC 512 to an SCC of the set of SCCs 514. The UE 504 may also transmit a second indication of the switch of the PC5 RRC link 515 from the PCC 516 to an SCC of the set of SCCs 518. Moreover, 1008 may be performed by component 199 in FIG. 11.

Figure 11:
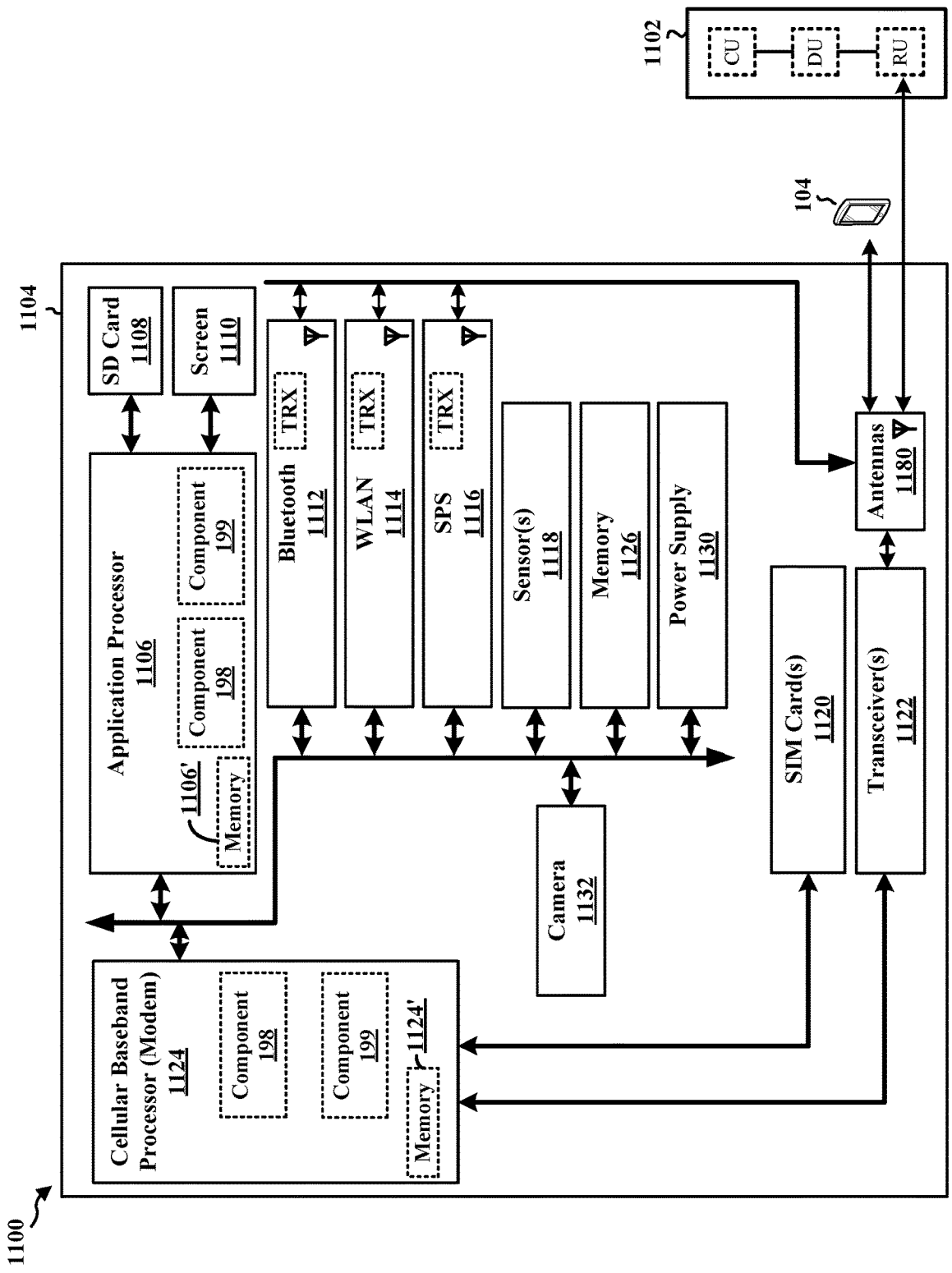
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial management unit (IMU), gyroscope, and/or accelerometer (s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRx) (or in some cases, just a receiver (Rx)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the wireless communication device 350 and may include the memory 360 and/or at least one of the Tx processor 368, the Rx processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see wireless communication device 350 of FIG. 3) and include the additional modules of the apparatus 1104.

As discussed supra, the component 198 is configured to establish a sidelink connection with a first UE via a first PCC or at least one second PCC. The first PCC and a first SCC may be associated with a first transmission of the first UE. The at least one second PCC and at least one second SCC may be associated with a second transmission of the second UE. The sidelink connection with the first UE may be associated with carrier aggregation. The component 198 may also be configured to detect that at least one of (i) the sidelink connection is associated with an RLF value that is within an RLF threshold of an RLF limit, or (ii) the first SCC or the at least one second SCC is capable of maintaining the sidelink connection. The component 198 may also be configured to transmit a first indication of at least one of (i) the sidelink connection being associated with the RLF value that is within the RLF threshold of the RLF limit, or (ii) the first SCC or the at least one second SCC being capable of maintaining the sidelink connection. The component 198 may also be configured to receive, based on the first indication, a second indication of a switch of the sidelink connection from the first PCC to the first SCC or from the at least one second PCC to the at least one second SCC. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for establishing a sidelink connection with a first UE via a first PCC or at least one second PCC. The apparatus 1104 may further include means for detecting that at least one of (i) the sidelink connection is associated with an RLF value that is within an RLF threshold of an RLF limit, or (ii) the first SCC or the at least one second SCC is capable of maintaining the sidelink connection. The apparatus 1104 may further include means for transmitting a first indication of at least one of (i) the sidelink connection being associated with the RLF value that is within the RLF threshold of the RLF limit, or (ii) the first SCC or the at least one second SCC being capable of maintaining the sidelink connection. The apparatus 1104 may further include means for receiving, based on the first indication, a second indication of a switch of the sidelink connection from the first PCC to the first SCC or from the at least one second PCC to the at least one second SCC. The apparatus 1104 may further include means for transmitting a first notification of the first PCC being associated with the first UE. The apparatus 1104 may further include means for receiving a second notification of the at least one second PCC being associated with the at least one second UE. The apparatus 1104 may further include means for transmitting at least the first transmission to the at least one second UE via the first PCC. The apparatus 1104 may further include means for receiving at least the second transmission from the at least one second UE via the at least one second PCC. The apparatus 1104 may further include means for detecting that the first SCC or the at least one second SCC is capable of maintaining the sidelink connection in response to detecting that at least one RSRP value for the first SCC or the at least one second SCC is greater than or equal to an RSRP threshold. The apparatus 1104 may further include means for transmitting a PCC configuration for the first SCC or the at least one second SCC in response to detecting that the first SCC or the at least one second SCC is capable of maintaining the sidelink connection. The apparatus 1104 may further include means for transmitting the PCC configuration for the first SCC in response to detecting that the at least one RSRP value for the first SCC is greater than a first set of detected RSRP values for a first set of other SCCs associated with the first transmission of the first UE. The apparatus 1104 may further include means for transmitting the PCC configuration for the at least one second SCC in response to detecting that the at least one RSRP value for the at least one second SCC is greater than a second set of detected RSRP values for a second set of other SCCs associated with the second transmission of the at least one second UE. The apparatus 1104 may further include means for transmitting a third indication to switch the sidelink connection from the first PCC to the first SCC or from the at least one second PCC to the at least one second SCC in response to detecting that at least one RSRP value for the first PCC or the at least one second PCC is less than or equal to an RSRP threshold. The apparatus 1104 may further include means for transmitting a third indication of an RLF in response to a failure to switch the sidelink connection from the first PCC or the at least one second PCC to the first SCC or the at least one second SCC. The apparatus 1104 may further include means for activating a first timer for a third transmission of a first sidelink RRC reconfiguration for a first sidelink connection with the at least one second UE via the first PCC upon activating a second timer for a fourth transmission of a second sidelink RRC reconfiguration for a second sidelink connection with the at least one second UE via the at least one second PCC. The means may be the component 198 of the apparatus 1104 configured to perform the functions recited by the means. As described supra, the apparatus 1104 may include the Tx processor 368, the Rx processor 356, and the controller/processor 359. As such, in one configuration, the means may be the Tx processor 368, the Rx processor 356, and/or the controller/processor 359 configured to perform the functions recited by the means.

As discussed supra, the component 199 is configured to establish a sidelink connection with at least one first UE via a first PCC or a second PCC. The at least one first PCC and at least one first SCC may be associated with a first transmission of the at least one first UE. The second PCC and a second SCC may be associated with a second transmission of the second UE. The sidelink connection with the at least one first UE may be associated with carrier aggregation. The component 199 may be further configured to receive a first indication of at least one of (i) the sidelink connection being associated with an RLF value that is within an RLF threshold of an RLF limit, or (ii) the at least one first SCC or the second SCC being capable of maintaining the sidelink connection. The component 199 may be further configured to switch, based on the first indication, the sidelink connection from the at least one first PCC to the at least one first SCC or from the second PCC to the second SCC. The component 199 may be further configured to transmit a second indication of the switch of the sidelink connection from the at least one first PCC to the at least one first SCC or from the second PCC to the second SCC. The component 199 may be within the cellular baseband processor 1124, the application processor 1106, or both the cellular baseband processor 1124 and the application processor 1106. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for establishing a sidelink connection with at least one first UE via a first PCC or a second PCC. The apparatus 1104 may further include means for receiving a first indication of at least one of (i) the sidelink connection being associated with an RLF value that is within an RLF threshold of an RLF limit, or (ii) the at least one first SCC or the second SCC being capable of maintaining the sidelink connection. The apparatus 1104 may further include means for switching, based on the first indication, the sidelink connection from the at least one first PCC to the at least one first SCC or from the second PCC to the second SCC. The apparatus 1104 may further include means for transmitting a second indication of the switch of the sidelink connection from the at least one first PCC to the at least one first SCC or from the second PCC to the second SCC. The apparatus 1104 may further include means for receiving a first notification of the at least one first PCC associated with the at least one first UE. The method may further include transmitting a second notification of the second PCC associated with the second UE. The apparatus 1104 may further include means for receiving at least the first transmission from the at least one first UE via the at least one first PCC. The method may further include transmitting at least the second transmission to the first UE via the second PCC. The apparatus 1104 may further include means for receiving a PCC configuration for the at least one first SCC or the second SCC. The apparatus 1104 may further include means for switching the sidelink connection from the at least one first PCC to the at least one first SCC in response to detecting that at least one RSRP value for the at least one first PCC or the second PCC is less than or equal to an RSRP threshold. The apparatus 1104 may further include means for receiving a third indication of an RLF that indicates a failure to switch the sidelink connection from the at least one first PCC or the second PCC to the at least one first SCC or the second SCC. The apparatus 1104 may further include means for switching, based on channel reciprocity between the at least one first PCC and the second PCC, a first sidelink connection from the at least one first PCC to the at least one first SCC in response to switching a second sidelink connection from the second PCC to the second SCC. The apparatus 1104 may further include means for activating a first timer for a third transmission of a first sidelink RRC reconfiguration for a first sidelink connection with the first UE via the at least one first PCC upon activating a second timer for a fourth transmission of a second sidelink RRC reconfiguration for a second sidelink connection with the at least one first UE via the second PCC. The means may be the component 199 of the apparatus 1104 configured to perform the functions recited by the means. As described supra, the apparatus 1104 may include the Tx processor 316, the Rx processor 370, and the controller/processor 375. As such, in one configuration, the means may be the Tx processor 316, the Rx processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Reference to a "set" or a "subset" of elements means that the set or subset has at least one element or may have a plurality of elements, but a set or subset of elements may not have zero elements. Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a first UE, the method may include establishing a sidelink connection with at least one second UE via a first PCC or at least one second PCC. The first PCC and a first set of SCCs may be associated with a first transmission of the first UE. The at least one second PCC and at least one second set of SCCs may be associated with a second transmission of the at least one second UE. The sidelink connection with the at least one second UE may be associated with carrier aggregation. The method may further include detecting that at least one of (i) the sidelink connection is associated with an RLF value that is within an RLF threshold of an RLF limit, or (ii) at least one of the first set of SCCs or at least one of the at least one second set of SCCs is capable of maintaining the sidelink connection. The method may further include transmitting a first indication of at least one of (i) the sidelink connection being associated with the RLF value that is within the RLF threshold of the RLF limit, or (ii) the at least one of the first set of SCCs or the at least one of the at least one second set of SCCs being capable of maintaining the sidelink connection. The method may further include receiving, based on the first indication, a second indication of a switch of the sidelink connection from the first PCC to a first SCC of the first set of SCCs or from the at least one second PCC to at least a second SCC of the at least one second set of SCCs.

Aspect 2 is the method of aspect 1, where the method may further include transmitting a first notification of the first PCC being associated with the first UE. The method may further include receiving a second notification of the at least one second PCC being associated with the at least one second UE.

Aspect 3 is the method of aspect 2, where the first notification may be transmitted in a first set of SSB SIBs or the second notification is received in a second set of SSB SIBs.

Aspect 4 is the method of any of aspects 1 to 3, where the method may further include transmitting at least the first transmission to the at least one second UE via the first PCC. The method may further include receiving at least the second transmission from the at least one second UE via the at least one second PCC.

Aspect 5 is the method of any of aspects 1 to 4, where the RLF value may include at least one of a number of RLC retransmissions of the sidelink connection, a timer indicating a transmission of a sidelink RRC reconfiguration for the sidelink connection, or a number of consecutive HARQ DTXs for a destination of the sidelink connection.

Aspect 6 is the method of any of aspects 1 to 5, where the method may further include detecting that the at least one of the first set of SCCs or the at least one of the at least one second set of SCCs may be capable of maintaining the sidelink connection in response to detecting that at least one RSRP value for the at least one of the first set of SCCs or the at least one of the at least one second set of SCCs is greater than or equal to an RSRP threshold.

Aspect 7 is the method of any of aspects 1 to 6, where the method may further include transmitting a first update for a first PCC configuration for the first set of SCCs in response to detecting that at least one of the first set of SCCs is capable of maintaining the sidelink connection. The method may further include transmitting a second update for a second PCC configuration for the at least one of the second set of SCCs in response to detecting that at least one of the at least one second set of SCCs is capable of maintaining the sidelink connection.

Aspect 8 is the method of any of aspects 1 to 7, where the method may further include transmitting a first update for a first PCC configuration for the first set of SCCs in response to detecting that at least one first RSRP value for the at least one of the first set of SCCs is greater than a first set of detected RSRP values for a first set of other SCCs associated with the first transmission of the first UE. The method may further include transmitting a second update for a second PCC configuration for the at least one second set of SCCs in response to detecting that at least one second RSRP value for the at least one of the at least one second set of SCCs is greater than a second set of detected RSRP values for a second set of other SCCs associated with the second transmission of the at least one second UE.

Aspect 9 is the method of any of aspects 1 to 8, where the method may further include transmitting a first update for a first PCC configuration for the first set of SCCs in response to detecting that at least one first RSRP value for the first PCC is less than or equal to an RSRP threshold. The method may further include transmitting a second update for a second PCC configuration for the at least one second set of SCCs in response to detecting that at least one second RSRP value for the at least one second PCC is less than or equal to the RSRP threshold Aspect 10 is the method of aspect 9, where the first update for the first PCC configuration may be transmitted in a MAC-CE or an SCI transmission.

Aspect 11 is the method of any of aspects 1 to 10, where the method may further include transmitting a third indication of a first RLF in response to a first failure to switch the sidelink connection from the first PCC to the first SCC of the first set of SCCs. The method may further include transmitting a fourth indication of a second RLF in response to a second failure to switch the sidelink connection from the at least one second PCC to the at least the second SCC of the at least one second set of SCCs.

Aspect 12 is the method of any of aspects 1 to 11, where the first PCC and the at least one second PCC may have overlapping resources. The first indication may include an indication that the at least one second PCC is associated with the RLF value that is within the RLF threshold of the RLF limit in response to detecting that the first PCC is associated with the RLF value that is within the RLF threshold of the RLF limit.

Aspect 13 is the method of any of aspects 1 to 12, where the first PCC and the at least one second PCC may have overlapping resources. The method may further include synchronizing a first timer with a second timer. The first timer may be associated with a first sidelink RRC reconfiguration for a first sidelink connection with the at least one second UE via the first PCC. The second timer may be associated with a second sidelink RRC reconfiguration for a second sidelink connection with the at least one second UE via the at least one second PCC.

Aspect 14 is a method of wireless communication at a second UE, the method may include establishing a sidelink connection with at least one first UE via a first PCC or a second PCC. The at least one first PCC and at least one first set of SCCs may be associated with a first transmission of the at least one first UE. The second PCC and a second set of SCCs may be associated with a second transmission of the second UE. The sidelink connection with the at least one first UE may be associated with carrier aggregation. The method may further include receiving a first indication of at least one of (i) the sidelink connection being associated with an RLF value that is within an RLF threshold of an RLF limit, or (ii) at least one of the at least one first set of SCCs or at least one of the second set of SCCs being capable of maintaining the sidelink connection. The method may further include switching, based on the first indication, the sidelink connection from the at least one first PCC to at least a first SCC of the at least one first set of SCCs or from the second PCC to a second SCC of the second set of SCCs. The method may further include transmitting a second indication of the switch of the sidelink connection from the at least one first PCC to the at least the first SCC of the first set of SCCs or from the second PCC to the second SCC of the second set of SCCs.

Aspect 15 is the method of aspect 14, where the method may further include receiving a first notification of the at least one first PCC associated with the at least one first UE. The method may further include transmitting a second notification of the second PCC associated with the second UE.

Aspect 16 is the method of aspect 15, where the first notification may be received in a first set of SSB SIBs or the second notification is transmitted in a second set of SSB SIBs.

Aspect 17 is the method of any of aspects 14 to 16, where the method may further include receiving at least the first transmission from the at least one first UE via the at least one first PCC. The method may further include transmitting at least the second transmission to the at least one first UE via the second PCC.

Aspect 18 is the method of any of aspects 14 to 17, where the RLF value may include at least one of a number of RLC retransmissions of the sidelink connection, a timer indicating a transmission of a sidelink RRC reconfiguration for the sidelink connection, or a number of consecutive HARQ DTXs for a destination of the sidelink connection.

Aspect 19 is the method of any of aspects 14 to 18, where the first indication that the at least one first set of SCCs or the second set of SCCs is capable of maintaining the sidelink connection may include at least one RSRP value for the at least one first set of SCCs or the second set of SCCs being greater than or equal to an RSRP threshold.

Aspect 20 is the method of any of aspects 14 to 19, where the method may further include receiving an update for a PCC configuration for the at least one first set of SCCs or the second set of SCCs.

Aspect 21 is the method of any of aspects 14 to 20, where the at least the first SCC of the first set of SCCs may have at least one first RSRP value being greater than a first set of detected RSRP values for a first set of other SCCs associated with the first transmission of the at least one first UE. The second SCC of the second set of SCCs may have at least one second RSRP value being greater than a second set of detected RSRP values for a second set of other SCCs associated with the second transmission of the second UE.

Aspect 22 is the method of any of aspects 14 to 21, where the method may further include switching the sidelink connection from the at least one first PCC to the at least the first SCC of the first set of SCCs in response to detecting that at least one first RSRP value for the at least one first PCC is less than or equal to an RSRP threshold. The method may further include switching the sidelink connection from the second PCC to the second SCC of the second set of SCCs in response to detecting that at least one second RSRP value for the second PCC is less than or equal to the RSRP threshold.

Aspect 23 is the method of any of aspects 14 to 22, where the method may further include receiving a third indication of an RLF that indicates a failure to switch the sidelink connection from the at least one first PCC to at least the first SCC of the first set of SCCs or from the second PCC to the second SCC of the second set of SCCs.

Aspect 24 is the method of aspect 23, where the third indication may be received in a MAC-CE or an SCI transmission.

Aspect 25 is the method of any of aspects 14 to 24, where the method may further include switching, based on channel reciprocity between the at least one first PCC and the second PCC, a first sidelink connection from the at least one first PCC to the at least one first SCC in response to switching a second sidelink connection from the second PCC to the second SCC.

Aspect 26 is the method of any of aspects 14 to 25, where the at least one first PCC and the second PCC may have overlapping resources. The method may further include activating a first timer for a third transmission of a first sidelink RRC reconfiguration for a first sidelink connection with the first UE via the at least one first PCC upon activating a second timer for a fourth transmission of a second sidelink RRC reconfiguration for a second sidelink connection with the at least one first UE via the second PCC.

Aspect 27 is an apparatus for wireless communication at a UE, including: a memory; and at least one processor coupled to the memory and, based at least in part on information stored in the memory, the at least one processor is configured to implement any of aspects 1 to 26.

Aspect 28 is the apparatus of aspect 27, further including at least one of an antenna or a transceiver coupled to the at least one processor.

Aspect 29 is an apparatus for wireless communication including means for implementing any of aspects 1 to 26.

Aspect 30 is a computer-readable medium (e.g., a non-transitory computer-readable medium) storing computer executable code, where the code when executed by a processor causes the processor to implement any of aspects 1 to 26.

What is claimed is:

1. An apparatus for wireless communication at a first user equipment (UE), comprising:
  memory; and
  at least one processor coupled to the memory and, based at least in part on information stored in the memory, the at least one processor is configured to:
    establish a sidelink connection with a second UE based on a first primary component carrier (PCC) configuration comprising a first PCC and a first set of secondary component carriers (SCCs) for a first transmission link from the first UE to the second UE or based on a second PCC configuration comprising a second PCC and a second set of SCCs for a second transmission link from the second UE to the first UE, and wherein the sidelink connection with the second UE is associated with carrier aggregation (CA);
    detect that at least one of (i) the sidelink connection is associated with a radio link failure (RLF) value that is within an RLF threshold of an RLF limit, or (ii) a first SCC of the first set of SCCs or a second SCC of the second set of SCCs is capable of maintaining the sidelink connection;
    transmit a first indication of at least one of (i) the sidelink connection being associated with the RLF value that is within the RLF threshold of the RLF limit, or (ii) the first SCC of the first set of SCCs or the second SCC of the second set of SCCs being capable of maintaining the sidelink connection; and
    receive, based on the first indication, a second indication of a switch of the established sidelink connection from the first PCC to the first SCC of the first set of SCCs for the first transmission link based on the first PCC configuration or from the second PCC to the second SCC of the second set of SCCs for the second transmission link based on the second PCC configuration.

2. The apparatus of claim 1, further comprising a transceiver coupled to the at least one processor, wherein the at least one processor is further configured to:
  transmit, using the transceiver, a first notification of the first PCC being associated with the first UE; or
  receive, using the transceiver, a second notification of the second PCC being associated with the second UE.

3. The apparatus of claim 2,
  wherein, to transmit the first notification of the first PCC being associated with the first UE, the at least one processor is configured to transmit a first set of synchronization signal block (SSB) system information blocks (SIBs) comprising the first notification; or
  wherein, to receive the second notification of the second PCC being associated with the second UE, the at least one processor is configured to receive a second set of SSB SIBs comprising the second notification.

4. The apparatus of claim 1, wherein the at least one processor is further configured to:
  transmit, via the first PCC of the first transmission link, a first transmission to the second UE; or
  receive, via the second PCC of the second transmission link, a second transmission from the second UE.

5. The apparatus of claim 1, wherein the RLF value comprises at least one of:
  a number of radio link control (RLC) retransmissions of the sidelink connection;
  a timer indicating a transmission of a sidelink radio resource control (RRC) reconfiguration for the sidelink connection; or
  a number of consecutive hybrid automatic repeat request (HARQ) discontinuous transmissions (DTXs) for a destination of the sidelink connection.

6. The apparatus of claim 1, wherein the at least one processor is further configured to:
  detect that the first SCC of the first set of SCCs or the second SCC of the second set of SCCs is capable of maintaining the sidelink connection in response to detecting that at least one reference signal received power (RSRP) value for the first SCC of the first set of SCCs or the second SCC of the second set of SCCs is greater than or equal to an RSRP threshold.

7. The apparatus of claim 1, wherein the at least one processor is further configured to:
  transmit a first update for the first PCC configuration to perform a handover of the first PCC to the first SCC in response to detecting that the first SCC of the first set of SCCs is capable of maintaining the sidelink connection; or
  transmit a second update for the second PCC configuration to perform a handover of the second PCC to the second SCC in response to detecting that the second SCC of the second set of SCCs is capable of maintaining the sidelink connection.

8. The apparatus of claim 1, wherein the at least one processor is further configured to:

transmit a first update for the first PCC configuration to perform a handover of the first PCC to the first SCC in response to detecting that at least one first RSRP value for the first SCC of the first set of SCCs is greater than a first set of detected RSRP values for a first set of other SCCs of the first set of SCCs; or transmit a second update for the second PCC configuration to perform a handover of the second PCC to the second SCC in response to detecting that at least one second RSRP value for the second SCC of the second set of SCCs is greater than a second set of detected RSRP values for a second set of other SCCs of the second set of SCCs.

9. The apparatus of claim 1, wherein the at least one processor is further configured to:

transmit a first update for the first PCC configuration to perform a handover of the second PCC to the second SCC in response to detecting that at least one first RSRP value for the first PCC is less than or equal to an RSRP threshold; or transmit a second update for the second PCC configuration to perform a handover of the second PCC to the second SCC in response to detecting that at least one second RSRP value for the at least one second PCC is less than or equal to the RSRP threshold.

10. The apparatus of claim 9, wherein, to transmit the first update for the first PCC configuration, the at least one processor is configured to:

transmit a medium access control (MAC) control element (MAC-CE) or a sidelink control information (SCI) transmission comprising the first update.

11. The apparatus of claim 1, wherein the at least one processor is further configured to:

transmit a third indication of a first RLF in response to a first failure to switch the sidelink connection from the first PCC to the first SCC of the first set of SCCs; or transmit a fourth indication of a second RLF in response to a second failure to switch the sidelink connection from the second PCC to the second SCC of the second set of SCCs.

12. The apparatus of claim 1, wherein the first PCC and the at least one second PCC have overlapping resources, and wherein the first indication comprises an indication that the second PCC is associated with the RLF value that is within the RLF threshold of the RLF limit in response to detecting that the first PCC is associated with the RLF value that is within the RLF threshold of the RLF limit.

13. The apparatus of claim 1, wherein the first PCC and the second PCC have overlapping resources, and wherein the at least one processor is further configured to:

synchronize a first timer with a second timer, wherein the first timer is associated with a first sidelink RRC reconfiguration for the first transmission link, and wherein the second timer is associated with a second sidelink RRC reconfiguration for the second transmission link.

14. An apparatus for wireless communication at a second user equipment (UE), comprising:

memory; and at least one processor coupled to the memory and, based at least in part on information stored in the memory, the at least one processor is configured to:

establish a sidelink connection with a first primary component carrier (PCC) configuration comprising a first PCC and a first set of secondary component carriers (SCCs) for a first transmission link from the first UE to the second UE or based on a second PCC configuration comprising a second PCC and a second set of SCCs for a second transmission link from the second UE to the first UE, and wherein the sidelink connection with the first UE is associated with carrier aggregation (CA);

receive a first indication of at least one of (i) the sidelink connection being associated with a radio link failure (RLF) value that is within an RLF threshold of an RLF limit, or (ii) a first SCC of the first set of SCCs or a second SCC of the second set of SCCs being capable of maintaining the sidelink connection;

switch, based on the first indication and at least one of the first PCC configuration or the second PCC configuration, the sidelink connection from the first PCC to the first SCC of the first set of SCCs or from the second PCC to the second SCC of the second set of SCCs; and transmit a second indication of the switch of the established sidelink connection from the first PCC to the first SCC of the first set of SCCs or from the second PCC to the second SCC of the second set of SCCs.

15. The apparatus of claim 14, further comprising a transceiver coupled to the at least one processor, wherein the at least one processor is further configured to:

receive, using the transceiver, a first notification of the first PCC associated with the first UE; or transmit, using the transceiver, a second notification of the second PCC associated with the second UE.

16. The apparatus of claim 15, wherein, to receive the first notification of the first PCC, the at least one processor is configured to receive a first set of synchronization signal block (SSB) system information blocks (SIBs) comprising the first notification; or wherein, to transmit the second notification of the second PCC, the at least one processor is configured to transmit a second set of SSB SIBs comprising the second notification.

17. The apparatus of claim 14, wherein the at least one processor is further configured to:

receive, via the first PCC of the first transmission link, a first transmission from the first UE; or transmit, via the second PCC of the second transmission link, a second transmission to the first UE.

18. The apparatus of claim 14, wherein the RLF value comprises at least one of:

a number of radio link control (RLC) retransmissions of the sidelink connection;

a timer indicating a transmission of a sidelink radio resource control (RRC) reconfiguration for the sidelink connection; or a number of consecutive hybrid automatic repeat request (HARQ) discontinuous transmissions (DTXs) for a destination of the sidelink connection.

19. The apparatus of claim 14, wherein the first indication that the first SCC of the first set of SCCs or the second SCC of the second set of SCCs is capable of maintaining the sidelink connection comprises at least one reference signal received power (RSRP) value for the first SCC of the first set of SCCs or the second SCC of the second set of SCCs being greater than or equal to an RSRP threshold.

20. The apparatus of claim 14, wherein the at least one processor is further configured to:

receive an update for the first PCC configuration or the second PCC configuration.

21. The apparatus of claim 14, wherein the first SCC of the first set of SCCs has at least one first RSRP value being greater than a first set of detected RSRP values for a first set of other SCCs of the first set of SCCs, or wherein the second SCC of the second set of SCCs has at least one second RSRP value being greater than a second set of detected RSRP values for a second set of other SCCs of the second set of SCCs.

22. The apparatus of claim 14, wherein the at least one processor is further configured to:
switch the sidelink connection from the first PCC to the first SCC of the first set of SCCs in response to detecting that at least one first RSRP value for the first PCC is less than or equal to an RSRP threshold; or
switch the sidelink connection from the second PCC to the second SCC of the second set of SCCs in response to detecting that at least one second RSRP value for the second PCC is less than or equal to the RSRP threshold.

23. The apparatus of claim 14, wherein the at least one processor is further configured to:
receive a third indication of an RLF that indicates a failure to switch the sidelink connection from the first PCC to the first SCC of the first set of SCCs or the second PCC to the second SCC of the second set of SCCs.

24. The apparatus of claim 23, wherein, to receive the third indication of the RLF, the at least one processor is configured to:
receive a medium access control (MAC) control element (MAC-CE) or a sidelink control information (SCI) transmission comprising the third indication of the RLF.

25. The apparatus of claim 14, wherein the at least one processor is further configured to:
switch, based on channel reciprocity between the first PCC and the second PCC, a first sidelink connection from the first PCC to the first SCC of the first set of SCCs in response to switching a second sidelink connection from the second PCC to the second SCC of the second set of SCCs.

26. The apparatus of claim 14, wherein the first PCC and the second PCC have overlapping resources, and wherein the at least one processor is further configured to:
correlate a second timer with a first timer, wherein the first timer is associated with a first sidelink RRC reconfiguration for the first transmission link, and wherein the second timer is associated with a second sidelink RRC reconfiguration for the second transmission link.

27. A method of wireless communication at a first user equipment (UE), comprising:
establishing a sidelink connection with a second UE based on a first primary component carrier (PCC) configuration comprising a first PCC and a first set of secondary component carriers (SCCs) for a first transmission link from the first UE to the second UE or based on a second PCC configuration comprising a second PCC and a second set of SCCs for a second transmission link from the second UE to the first UE, and wherein the sidelink connection with the second UE is associated with carrier aggregation (CA);
detecting that at least one of (i) the sidelink connection is associated with a radio link failure (RLF) value that is within an RLF threshold of an RLF limit, or (ii) a first SCC of the first set of SCCs or a second SCC of the second set of SCCs is capable of maintaining the sidelink connection;
transmitting a first indication of at least one of (i) the sidelink connection being associated with the RLF value that is within the RLF threshold of the RLF limit, or (ii) the first SCC of the first set of SCCs or the second SCC of the second set of SCCs being capable of maintaining the sidelink connection; and
receiving, based on the first indication, a second indication of a switch of the established sidelink connection from the first PCC to the first SCC of the first set of SCCs for the first transmission link based on the first PCC configuration or from the second PCC to the second SCC of the second set of SCCs for the second transmission link based on the second FCC configuration.

28. The method of claim 27, further comprising:
transmitting a first notification of the first PCC being associated with the first UE; or
receiving a second notification of the second PCC being associated with the second UE.

29. A method of wireless communication at a second user equipment (UE), comprising:
establishing a sidelink connection with a first UE based on a first primary component carrier (PCC) configuration comprising a first PCC and a first set of secondary component carriers (SCCs) for a first transmission link from the first UE to the second UE or based on a second PCC configuration comprising a second PCC and a second set of SCCs for a second transmission link from the second UE to the first UE, and wherein the sidelink connection with the first UE is associated with carrier aggregation (CA);
receiving a first indication of at least one of (i) the sidelink connection being associated with a radio link failure (RLF) value that is within an RLF threshold of an RLF limit, or (ii) a first SCC of the first set of SCCs or a second SCC of the second set of SCCs being capable of maintaining the sidelink connection;
switching, based on the first indication and at least one of the first PCC configuration or the second PCC configuration, the sidelink connection from the first PCC to the first SCC of the first set of SCCs or from the second PCC to the second SCC of the second set of SCCs; and
transmitting a second indication of the switch of the established sidelink connection from the first PCC to the first SCC of the first set of SCCs or from the second PCC to the second SCC of the second set of SCCs.

30. The method of claim 29, further comprising:
receiving a first notification of the first PCC associated with the first UE; or
transmitting a second notification of the second PCC associated with the second UE.

* * * * *